US010786973B2

(12) United States Patent
Simmons et al.

(10) Patent No.: US 10,786,973 B2
(45) Date of Patent: *Sep. 29, 2020

(54) JOINED FIBER-REINFORCED COMPOSITE MATERIAL ASSEMBLY WITH TUNABLE ANISOTROPIC PROPERTIES

(71) Applicant: Carbitex, Inc., Kennewick, WA (US)

(72) Inventors: Kevin Lynn Simmons, Kennewick, WA (US); Junus Ali Khan, Pasco, WA (US); Tyler Andre Kafentzis, Richland, WA (US); Keshava Bhamidipaty, Richland, WA (US)

(73) Assignee: Carbitex, Inc., Kennewick, WA (US)

( * ) Notice: Subject to any disclaimer, the term of this patent is extended or adjusted under 35 U.S.C. 154(b) by 276 days.

This patent is subject to a terminal disclaimer.

(21) Appl. No.: 15/942,259

(22) Filed: Mar. 30, 2018

(65) Prior Publication Data
US 2018/0222148 A1 Aug. 9, 2018

Related U.S. Application Data

(63) Continuation of application No. 15/220,352, filed on Jul. 26, 2016, now Pat. No. 9,993,993.
(Continued)

(51) Int. Cl.
*B32B 7/02* (2019.01)
*A43B 13/12* (2006.01)
(Continued)

(52) U.S. Cl.
CPC .............. *B32B 7/02* (2013.01); *A43B 13/026* (2013.01); *A43B 13/12* (2013.01); *A43B 13/141* (2013.01);
(Continued)

(58) Field of Classification Search
CPC .. B32B 5/02; B32B 5/022; B32B 5/04; B32B 5/12
(Continued)

(56) References Cited

U.S. PATENT DOCUMENTS 4,356,227 A 10/1982 Stenzenberger et al.
4,623,574 A 11/1986 Harpell et al.
(Continued)

FOREIGN PATENT DOCUMENTS

DE 10103054 C1 1/2002
DE 102005050861 A1 5/2007
(Continued)

OTHER PUBLICATIONS

European Patent Office, Communication pursuant to Article 94(3) EPC. EP Patent Application 16738241.5, dated May 14, 2019, 8 pages.
(Continued)

*Primary Examiner* — Maria V Ewald
*Assistant Examiner* — Zachary M Davis
(74) *Attorney, Agent, or Firm* — Perkins Coie LLP

(57) ABSTRACT

An anisotropic composite material assembly comprising a first layer with a tensile modulus different from its compressive modulus and that exhibits variable modulus behavior. The first layer elastically buckle under compressions. A second layer has a tensile modulus substantially the same as its compressive modulus. The first and second layers are joined together, and the assembly is bendable in a first direction with an outer surface of the first layer being in compression and the assembly has a first bending stiffness during bending in the first direction. The assembly is bendable in a second direction opposite the first direction with the outer surface of the first layer being in tension, and the
(Continued)

assembly has a second bending stiffness greater than the first bending stiffness during bending in the second direction.

20 Claims, 18 Drawing Sheets

Related U.S. Application Data

(60) Provisional application No. 62/262,335, filed on Dec. 2, 2015.

(51) Int. Cl.
*B32B 5/02* (2006.01)
*A43B 13/14* (2006.01)
*B32B 5/26* (2006.01)
*B32B 15/00* (2006.01)
*B32B 27/12* (2006.01)
*B32B 27/36* (2006.01)
*A43B 13/02* (2006.01)

(52) U.S. Cl.
CPC ............. *B32B 5/024* (2013.01); *B32B 5/26* (2013.01); *B32B 15/00* (2013.01); *B32B 27/12* (2013.01); *B32B 27/365* (2013.01); *B32B 2260/021* (2013.01); *B32B 2260/046* (2013.01); *B32B 2260/048* (2013.01); *B32B 2262/106* (2013.01); *B32B 2307/54* (2013.01); *B32B 2307/546* (2013.01); *B32B 2307/706* (2013.01); *B32B 2437/02* (2013.01)

(58) Field of Classification Search
USPC .................... 428/212; 442/103, 104, 179
See application file for complete search history.

(56) References Cited

U.S. PATENT DOCUMENTS

| | | | |
|---|---|---|---|
| 5,122,403 | A | 6/1992 | Roginski et al. |
| 5,895,105 | A | 4/1999 | Nesbitt |
| 9,370,904 | B2 | 6/2016 | Khan |
| 9,993,993 | B2 | 6/2018 | Simmons et al. |
| 10,093,085 | B2 | 10/2018 | Simmons et al. |
| 10,301,769 | B2 | 5/2019 | Simmons et al. |
| 2004/0058603 | A1 | 3/2004 | Hayes et al. |
| 2004/0086735 | A1 | 5/2004 | Monsheimer et al. |
| 2007/0042170 | A1 | 2/2007 | Morin |
| 2008/0010863 | A1 | 1/2008 | Auger et al. |
| 2009/0151200 | A1 | 6/2009 | Niedermeyer et al. |
| 2010/0078201 | A1 | 4/2010 | Yoshizaki et al. |
| 2010/0186257 | A1 | 7/2010 | Karl et al. |
| 2011/0260945 | A1 | 10/2011 | Karasawa |
| 2012/0313307 | A1 | 12/2012 | Cartwright et al. |
| 2013/0231022 | A1 | 9/2013 | Kraatz et al. |
| 2014/0057096 | A1 | 2/2014 | Moser |
| 2014/0150291 | A1 | 6/2014 | Larsen et al. |
| 2016/0122482 | A1 | 5/2016 | Higuchi et al. |
| 2018/0015703 | A1 | 1/2018 | Fossat et al. |

FOREIGN PATENT DOCUMENTS

| | | |
|---|---|---|
| EP | 223061 A2 | 5/1987 |
| EP | 2484710 A1 | 8/2012 |
| GB | 2466792 A | 7/2010 |
| IT | TO2015A000061 | 1/2018 |
| JP | 2012231140 A | 11/2012 |
| WO | 0151263 A1 | 7/2001 |
| WO | 2004065117 A2 | 8/2004 |
| WO | 2004089143 A2 | 10/2004 |
| WO | 2007046118 A1 | 4/2007 |
| WO | 2009076499 A1 | 6/2009 |
| WO | 2014160506 A2 | 10/2014 |
| WO | 2015012237 A1 | 1/2015 |
| WO | 2015065460 A1 | 5/2015 |
| WO | 2016120785 A1 | 8/2016 |
| WO | 2017095479 A1 | 6/2017 |

OTHER PUBLICATIONS

International Searching Authority, International Search Report and Written Opinion, PCT Application PCT/US2016/028706, dated Aug. 11, 2016, 13 pages.
International Searching Authority, International Search Report and Written Opinion, PCT Application PCT/US2016/037093, dated Sep. 26, 2016, 14 pages.
International Searching Authority, International Search Report and Written Opinion, PCT/US2019/032746, dated Aug. 27, 2019., 15 pages.
International Bureau of WIPO, International Preliminary Report on Patentability, PCT Application PCT/US2016/037093, dated Dec. 21, 2017, 10 pages.
PCI "Lumiflon Comes to America" from pcimag.com, Sep. 1, 2002, 4 pages.
"Properties of Carbon Fiber—Clearwater Composites, LLC" webpage http://www.clearwatercomposites.com/resources/Propertiesofcarbonfiber, archived Dec. 20, 2014, accessed May 19, 2017.
International Searching Authority, International Preliminary Report on Patentability, PCT/US2016/044123, dated Jun. 14, 2018, 13 pages.
International Searching Authority, International Search Report and Written Opinion, PCT/US2016/044123, dated Sep. 21, 2016, 17 pages.

JOINED FIBER-REINFORCED COMPOSITE MATERIAL ASSEMBLY WITH TUNABLE ANISOTROPIC PROPERTIES

CROSS-REFERENCE TO RELATED APPLICATION(S)

This continuation patent application claims the benefit of and priority to U.S. patent application Ser. No. 15/220,352, titled Joined Fiber-Reinforced Composite Material Assembly with Tunable Anisotropic Properties, filed Jul. 26, 2016, and U.S. Provisional Patent Application No. 62/262,335, titled Composite Beam Construction with Tunable Anisotropic Properties, filed Dec. 2, 2015, each of which is incorporated herein in its entirety by reference thereto.

TECHNICAL FIELD

This application relates in general to anisotropic materials, and, in particular, to composite beam construction with tunable anisotropic properties, including assemblies incorporating the composite beam construction.

BACKGROUND

In general, materials are isotropic or anisotropic. Isotropic materials have identical properties in all directions. Conversely, properties of anisotropic materials are directionally and geometrically dependent.

Conventionally, in applications that require the use of materials that permit bending, materials such as metal, polymers, or composite can be used to form flexural beams. The modulus of the materials used in the beams and their geometry influence the stiffness. Depending on the material used to construct the beam, the beam can have isotropic or anisotropic properties. Nevertheless, beams constructed with such materials have an inherent inability to exhibit a low bending resistance in one direction and a high bending resistance in the other. Furthermore, these materials exhibit a linear relationship between stress and strain.

Many products, such as consumer products, including footwear and apparel, medical devices, medical appliances, manufacturing products, and many other products, incorporate materials to provide a selected degree of stiffness while still allowing for some flexibility for bending during use. However, oftentimes, desired characteristics within a shoe or other similar products can be at odds with other desired characteristics. For example, footwear often incorporates materials that allow the sole assembly to bend and flex with a wearer's foot during use, while also providing a desired level of protection and structural stability to the foot. For example, a sole assembly construction that provides enhanced flexibility is often provided at the sacrifice of structural stiffness and or stability. Conversely, the use of materials to provide enhanced structural stiffness and stability are often at the sacrifice of flexibility.

In materials with a linear relationship between stress and strain, stiffness is constant. However, in many applications, materials that increase stiffness as a function of strain are desirable. For example, in some products such as footwear, it is desirable to allow the footwear to bend in the toe region to allow the wearer's toes to bend through a normal range of motion. It is also desirable, however, for the footwear to provide a stiffness that prevents the toe region from bending past the normal range of motion resulting in a condition of increased strain, thereby avoiding hyperextension of the wearer's toes (i.e., turf toe). Similarly, it is desirable to provide a brace or other medical appliance that allows for bending or articulation of a portion of a wearer's body through a normal or selected range of motion. It is also desirable, however, to provide a stiffness that prevents articulation of the body portion beyond the normal or selected range of motion, which would create a condition of increased strain. The present technology can achieve this desirable configuration that increases stiffness as a function of strain.

Linear stiffness behavior and tradeoffs between competing performance and operating characteristics is often encountered in the manufacturer and/or use of a wide variety of products. Accordingly, there is a need for a material suitable for applications requiring variable modulus material (i.e. anisotropic flexural material or strain stiffening material).

SUMMARY

An embodiment of the present technology provides a joined, fiber-reinforced composite material assembly with tunable anisotropic properties. The assembly of an embodiment is configured to exhibit a low resistance to bending in one direction and a high resistance to bending in the other direction. At least one embodiment provides an assembly usable in footwear, athletic equipment and/or other products.

An embodiment of the present technology provides an anisotropic composite material assembly comprising a first layer having a first tensile modulus and a first compressive modulus lower than the first tensile modulus, such that the first layer of the assembly is configured to elastically buckle under compression. A rigid second layer is fixedly joined to the first layer. The assembly is elastically bendable in a first direction with an outer surface of the first layer being in compression, and the assembly has a first bending stiffness during bending in the first direction. The assembly is elastically bendable in a second direction opposite the first direction with the outer surface of the first layer being in tension. The assembly has a second bending stiffness greater than the first bending stiffness during bending in the second direction.

Another embodiment of the present technology provides an anisotropic composite material comprising a first layer having a first tensile modulus and a first compressive modulus less than the first tensile modulus. The first layer of the assembly is configured to elastically buckle under compression. A second layer is joined to the first layer. The second layer has a second tensile modulus and a second compressive modulus substantially the same as the second tensile modulus. The assembly is bendable in a first direction with an outer surface of the first layer being in compression, wherein the assembly has a first bending resistance during bending in the first direction. The assembly is bendable in a second direction opposite the first direction with the outer surface of the first layer being in tension, and the assembly has a second bending resistance greater than the first bending resistance during bending in the second direction.

Another embodiment provides an anisotropic composite material assembly. The assembly has a first layer comprising at least one fiber-reinforced composite material with fabric having first fibers interlaced with second fibers at a selected angle relative to each other. An elastically deformable matrix encapsulates the fabric. The first layer has a first modulus of elasticity in tension (i.e., first tensile modulus), and first or second fibers of the fiber-reinforced composite material are configured to elastically bend and buckle under compression loads on the first layer. A second layer is joined to the first layer at an intermediate interface area. The second layer comprises a rigid material having a second modulus of elasticity in tension (i.e., second tensile modulus) greater than or equal to the first tensile modulus. In another embodiment, the second tensile modulus can be less than the first tensile modulus. The assembly is bendable about an axis in a first direction that puts the first layer in tension and the second layer in compression. The assembly has a first bending stiffness when the assembly is bent in the first direction. The assembly is bendable about the axis in a second direction substantially opposite the first direction, and bending in the second direction puts the second layer in tension and the first layer in compression causing the first or second fibers to elastically buckle. The assembly has a second bending stiffness less than the first bending stiffness when the assembly is bent in the second direction.

Another embodiment provides an anisotropic composite material assembly having a first layer with a fiber-reinforced composite material with fabric, and an elastically deformable matrix encapsulating the fabric. The first layer has a first tensile modulus, and the fiber-reinforced composite material is configured to elastically bend and buckle under compression loads in the first layer. A second layer is joined to the first layer and has a second tensile modulus less than or equal to the first tensile modulus. The second tensile modulus can be greater than the first tensile modulus. The assembly bends in a first direction that puts the first layer in tension and the second layer in compression, and the assembly has a first bending stiffness when the assembly is bent in the first direction. The assembly bends in a second direction substantially opposite the first direction that puts the second layer in tension and the first layer in compression causing the first layer to buckle. The assembly has a second bending stiffness less than the first bending stiffness when the assembly is bent in the second direction.

Another embodiment provides an anisotropic composite material assembly with a first layer having a first fiber-reinforced composite material with fibers impregnated with matrix, wherein the first layer has a first tensile modulus and a first compressive modulus less than the first tensile modulus. The fiber-reinforced composite material is configured to bend and elastically buckle under compression loads in the first layer. A second layer comprises a second fiber-reinforced composite material joined to the first layer. The second layer has a second tensile modulus greater than or equal to the first tensile modulus, and the second layer has a second compressive modulus substantially the same as the second tensile modulus. The second tensile modulus can be less than the first tensile modulus. The assembly bends in a first direction that puts the first layer in tension and second layer in compression, and the assembly has a first bending stiffness when the assembly is bent in the first direction. The assembly bends in a second direction substantially opposite the first direction that puts the second layer in tension and the first layer in compression causing the first layer to elastically buckle. The assembly has a second bending stiffness less than the first bending stiffness when the assembly is bent in the second direction.

Another embodiment provides an anisotropic bendable plate assembly comprising a first layer of flexible material having a plurality of arranged fibers, wherein the first layer has a first rigidity, a first tensile modulus, and a first compressive modulus lower than the first tensile modulus. A rigid second layer is fixedly connected to the first layer in a substantially parallel orientation. The second layer has a second rigidity greater than the first rigidity. The plate assembly is elastically bendable in a first direction with an outer surface of the first layer being in compression, and with the plurality of arranged fibers elastically buckled. The plate assembly is elastically bendable in a second direction opposite the first direction with the outer surface of the first layer being in tension. The plate assembly has a first bending stiffness during bending in the first direction and a second bending stiffness greater than the first bending stiffness during bending in the second direction.

Another embodiment provides a sole assembly for an article of footwear. The sole assembly has an outsole, a midsole coupled to the outsole, and an anisotropic plate assembly positioned adjacent to the midsole. The plate assembly comprises an upper layer having a first rigidity, a first tensile modulus, and a first compressive modulus different than the first tensile modulus. The upper layer is configured to elastically buckle under compression. The upper layer has a plurality of arranged fibers at least partly encapsulated in a matrix material. A rigid lower layer has a second rigidity greater than the first rigidity, and has a second tensile modulus and a second compressive modulus substantially the same as the second tensile modulus. A thermoplastic film is between the upper and lower layers. The upper and lower layers are joined together at an interface area defined by the thermoplastic film. The plate assembly is elastically bendable in opposing first and second directions. An outer surface of the upper layer is in compression during bending in the first direction and in tension during bending in the second direction. The plate assembly has a first bending stiffness during bending in the first direction and a second bending stiffness greater than the first bending stiffness during bending in the second direction.

Another embodiment provides an anisotropic composite material assembly that comprises a first layer comprising a plurality of sheets of fabric joined together and each having first fibers interlaced with second fibers at a selected angle relative to the each other. The first layer has a first rigidity, a first tensile modulus, and a first compressive modulus. At least the first or second fibers in the plurality of sheets of fabric are configured to elastically buckle under coplanar compressive loads. A rigid second layer is joined to the first layer at an intermediate interface area. The second layer has a rigid material with a second rigidity greater than the first rigidity, and has a second tensile modulus and a second compressive modulus. A thin intermediate film at the intermediate interface area is affixed to the first and second layers. The assembly is elastically bendable about an axis in a first direction that puts the first layer in tension and the second layer in compression, and the assembly is elastically bendable about the axis in a second direction opposite to the first direction that puts the first layer in compression and the second layer in tension. The assembly has a first bending stiffness when the assembly is bent in the first direction and a second bending stiffness less than the first bending stiffness when bent in the second direction.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

Embodiments of the technology introduced herein may be better understood by referring to the following Detailed Description in conjunction with the accompanying drawings, in which like reference numerals indicate identical or functionally similar elements.

Figure 1A:
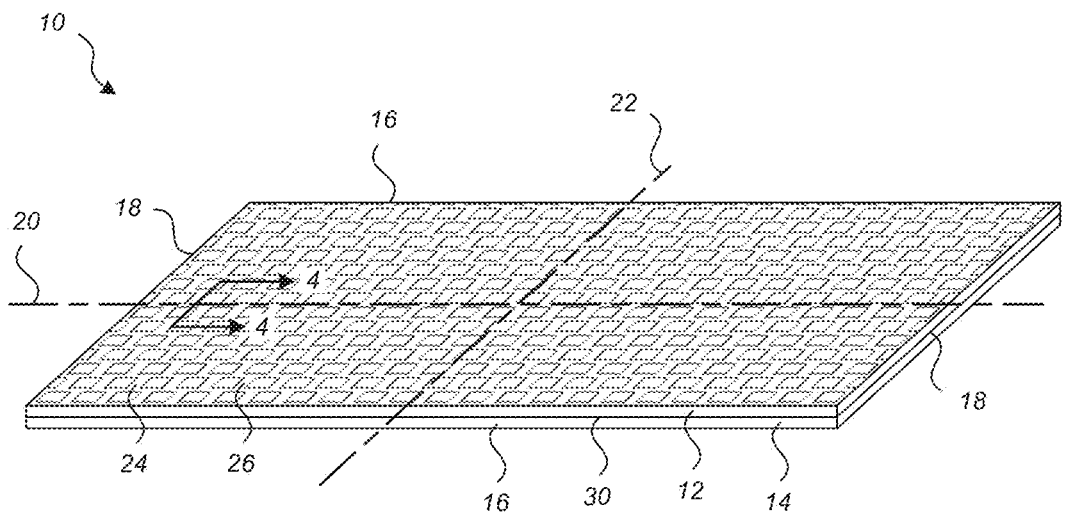
FIG. 1A is an isometric view of a fiber-reinforced composite material assembly with tunable anisotropic properties shown in a planar, un-flexed configuration in accordance with an embodiment of the present technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1B:
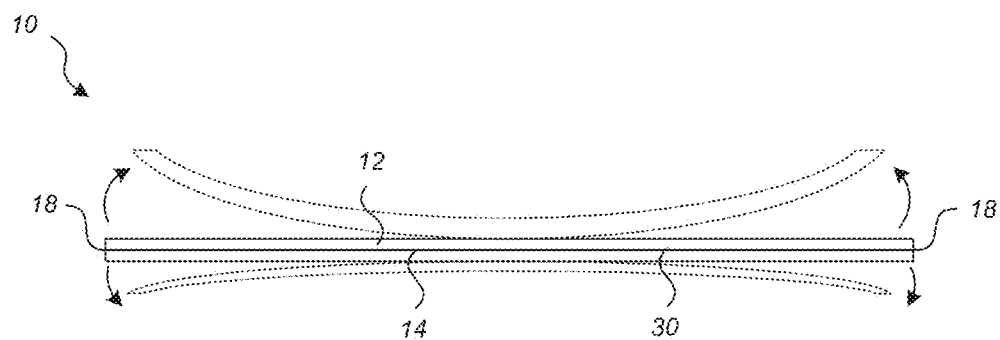
FIG. 1B is a schematic side elevation view of the assembly of FIG. 1A shown in phantom lines in an upward deflection configuration and downward deflection configuration.

FIG. 1A illustrates a fiber-reinforced composite material assembly 10 with tunable anisotropic properties shown in a planar, un-flexed configuration in accordance with an embodiment of the present technology. FIG. 1B illustrates the assembly 10 in solid lines in a flat, relaxed position, and in phantom lines in an upward deflection configuration and a downward deflection configuration. The assembly 10 has a first layer 12 of fiber-reinforced composite material fixedly and permanently joined with a second layer 14 of durable, rigid substrate (i.e., polycarbonate, nylon, plastic, metal, rigid fiber-based material, elastomer, etc.) whose flexural modulus is greater than approximately 20,000 psi. The joined assembly 10 is a bendable planar assembly, which is described herein with reference to the spatial orientation as shown in FIG. 1A. Accordingly, the first layer 12 is shown in FIGS. 1A and 1B as a top layer, and the second layer 14 is shown as a bottom layer. It is noted that the terms "top" and "bottom" are used for purposes of convenience to discuss orientation, and it is to be understood that the assembly can be positioned in other spatial orientations, such as an inverted orientation to that shown in FIG. 1A, so that the first layer 12 is below the second layer 14. Alternatively, the assembly 10 can exist in a contoured shape.

The assembly 10 is illustrated in FIG. 1A as a rectangular segment with opposing side edges 16 extending between opposing ends 18. The first and second layers 12 and 14 are fixedly joined together along a plane defined by a longitudinal axis 20 and a lateral axis 22 perpendicular to each other. The assembly 10 is shown in a flat, planar, relaxed position (i.e., in a neutral orientation) wherein the longitudinal and lateral axes 20 and 22 are parallel to a neutral plane extending through the assembly 10. The assembly 10 is configured in at least one embodiment as an anisotropically-flexible beam, such that the assembly 10 can be bent away from the relaxed position in a first direction (i.e., upwardly) about the lateral axis 22 with the opposing ends 18 move upwardly. The illustrated assembly 10 has a relatively low bending resistance to bending forces that cause the assembly 10 to bend upwardly, as seen in FIG. 1B. The beam defined by the assembly 10 is also constructed to bend slightly away from the relaxed position in a second direction opposite the first direction (i.e., downwardly), such that the opposing ends 18 move downwardly. In this downwardly bending condition, however, the assembly 10 has a substantially higher resistance to bending forces that cause the assembly to bend downwardly. The joined, fiber-reinforced composite assembly 10 can be tuned to be flexible and easily bendable in the first direction, but being rigid and inflexible to bending in the opposite direction.

The first layer 12 can be configured to control bending characteristics of the assembly 10 in a selected direction, (e.g., bending downwardly). In one embodiment, the first layer 12 of the assembly 10 is made of a material having a tensile modulus that is substantially greater than the material's compressive modulus. As discussed herein, reference to a material's modulus (tensile or compressive modulus) is referring to the modulus of elasticity of the material in tension and/or compression. The first layer 12 can be a fiber-reinforced composite material having unidirectional fibers or interlaced fiber encapsulated and/or impregnated in a selected flexible matrix configured so the composite material alone is flexible and pliable or non-rigid. The fibers in the first layer 12 can be inorganic fibers (e.g., carbon fibers, glass fibers, ceramic, fibers, metal fibers, other fibers, and/or combinations thereof), organic or synthetic fibers (e.g., polymer fibers such as polyamides, polyesters, or combinations thereof), natural fibers, and/or combinations thereof. The material of the first layer 12 can be configured such that the assembly 10 can exhibit strain stiffening behavior. Accordingly, the rate of stiffening in the material can increase in response to increased strain. This configuration provides an assembly with asymmetric flexural characteristics.

In one embodiment, the first layer 12 can be a woven, carbon fiber-based composite material having warp fiber bundles 24 substantially parallel to each other and the side edges 16. The warp fiber bundles 24 are woven with weft fiber bundles 26, wherein the weft fiber bundles 26 substantially parallel to each other and at a selected angle relative to the warp fibers 24 and/or the side edges 16. In the illustrated embodiment of FIG. 1A, the warp and weft fiber bundles 24 and 26, respectively, are woven at approximately a 90-degree orientation relative to each other, although the woven fibers 24 and 26 can have different fiber orientations relative to each other. The first layer 12 may be made of one or more sheets of a tunable, non-rigid fiber-reinforced composite material. The first layer 12 can be configured with matrix material and plurality of fibers, such that the first layer is orthotropic. In one embodiment, the first layer 12 is made of a stretchable fiber-based composite material, such as the material disclosed in U.S. patent application Ser. No. 15/135,455, titled Stretchable Fiber-Based Composite Material, filed Apr. 22, 2016, and which is incorporated herein in its entirety by reference thereto. The assembly 10 can also include tunable fiber-based composite materials with binder-enhanced properties, such as the materials as described in U.S. patent application Ser. No. 15/179,949, titled Composite materials with Binder-Enhanced Properties and Methods of Production Thereof, filed on Jun. 10, 2016, which is incorporated herein in its entirety by reference thereto.

The assembly 10 can be constructed as a laminate material by combining a carbon fiber epoxy plate that defines the second layer 14 with a fiber reinforced nitrile butadiene rubber and thermoplastic polyurethane film that defines the first layer 12. The strengths and stiffness of fibrous composite materials in the first layer 12 are dependent on the properties of the type of fiber used, the orientation of the fiber, and the resin matrix used to encapsulate and/or impregnate the fibers. In one embodiment, the material used in the first layer 12 can be a nitrile butadiene rubber impregnation with thermoplastic polyurethane films. Unlike the first layer 12, the second layer 14 is made of a material that has a tensile modulus substantially the same as its compressive modulus. The second layer 14 can be a rigid carbon fiber epoxy plate. Other types of materials can be used in the second layer, such as steel, stainless steel, titanium, aluminum, other metal material, polycarbonate, polyamide, polyurethane, low density polyurethane, nitrile rubber, butyl rubber, and combinations thereof. The compressive modulus of the material used in the second layer 14 must be greater than the compressive modulus of the material used in the first layer 12 to provide the fiber-reinforced composite joined assembly 10 in the form of an anisotropically-flexible beam with the necessary anisotropic properties in compression and tension. In one embodiment, the second layer 14 can comprise a plate with a modulus of elasticity in the range of approximately 30 ksi-40,000 ksi. In another embodiment, the first layer 12 can be a carbon fiber layer impregnated or encapsulated with a resin matrix at 100% modulus in the range of approximately 5 psi-5,000 psi. In other embodiments, the matrix of the first layer 12 can be formed of thermoplastic polyurethanes, thermoplastic elastomers, thermoplastic polyolefins, silicone, acrylates, polyamides, polyurethanes, nitrile and butyl rubbers, and styrenic block copolymers. The matrix material can be selected or configured to have a range of matrix properties, such as a modulus of elasticity in the range of approximately 5-3,000 psi. In another, embodiment the matrix can have a modulus in the range of approximately 5-2000 psi. In another, embodiment the matrix can have a modulus in the range of approximately 5-1000 psi. In another, embodiment the matrix can have a modulus in the range of approximately 20-500 psi. In another, embodiment the matrix can have 50-500 psi In yet another embodiment, the matrix can have a modulus in the range of approximately 50-300 psi. The two layers 12 and 14 of the assembly 10 in the illustrated embodiment are laminated or otherwise joined together under 200° F. to 375° F. for about ten minutes or less to form an asymmetric beam that has high bending stiffness (moduli) in one bending direction and a low bending stiffness in the opposite direction. In other embodiments, the two layers 12 and 14 could be joined with other adhesive materials or using other laminating techniques.

Figure 2:
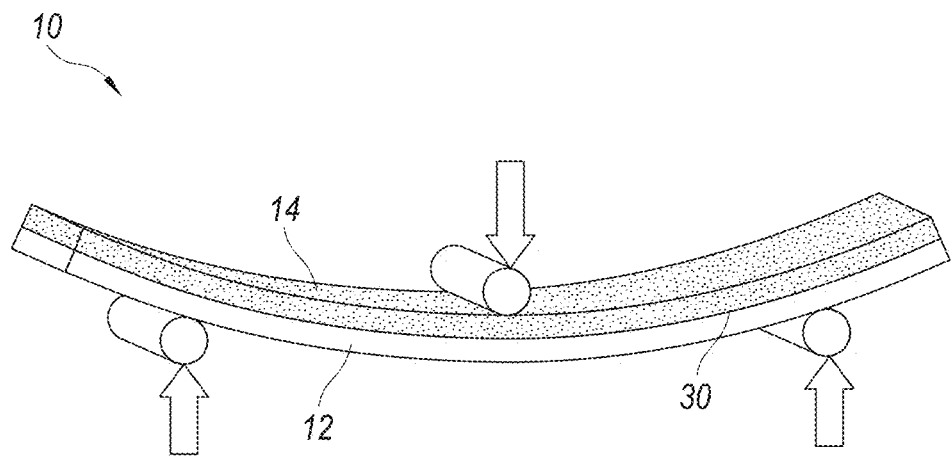
FIG. 2 is a schematic illustration showing, by way of example, a three-point bend of a simple beam made of the assembly of FIG. 1A positioned in a first orientation.
Figure 3:
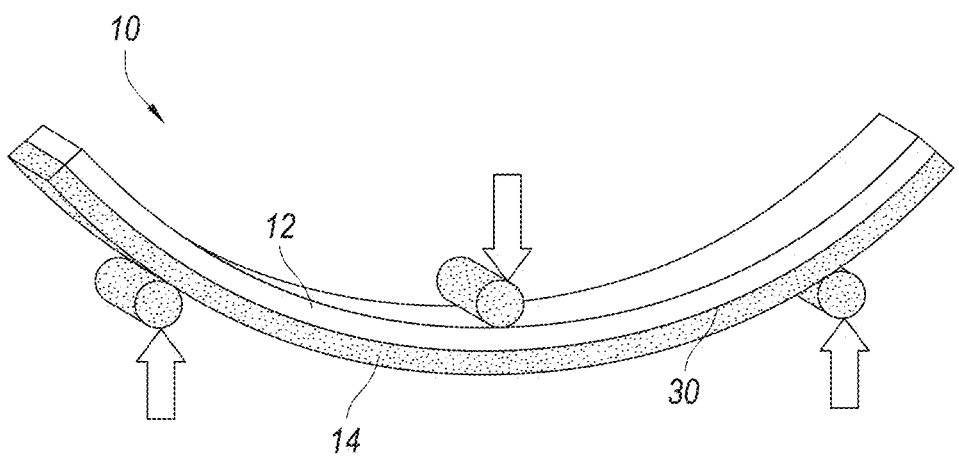
FIG. 3 is a schematic illustration showing, by way of example, a three-point bend of the simple beam of FIG. 2, wherein the assembly is in an upside down configuration with the bend in the opposite direction of FIG. 2.

FIG. 2 is an illustration showing, by way of example, a three-point bend on the assembly 10 with the first and second layers 12 and 14, respectively, forming an anisotropically-flexible beam having two different moduli. The assembly 10 is shown in FIG. 2 in an inverted position compared to FIG. 1B and corresponding to a downward bending configuration as referenced above, such that the second layer 14 is in compression, and the first layer 12 is in tension. The assembly 10 is very resistant to the downward bending loads because the fiber-reinforced composite material forming the first layer 12 has a very high tensile modulus, so when the warp and/or weft fibers 24, 26 (FIG. 1A) are in tension, the fibers substantially prevent or resist excessive bending. In one embodiment, the first layer 12 has a tensile modulus in the range of approximately 3-5,000 ksi. In another embodiment, the first layer 12 can have a tensile modulus in the range of approximately 3-2,000 ksi, 5-2,000 ksi, 25-1500 ksi, or 100-2,000 ksi, When the assembly 10, however, is bent in the opposite direction so as to put the second layer 14 in tension, the assembly 10 is more flexible. FIG. 3 is an illustration showing, by way of example, the assembly 10 as a simple beam being bent upwardly in three-point bending (i.e., in the opposite direction as shown in FIG. 2) with the same force as applied in FIG. 2. In FIG. 3, the first layer 12 is now in compression, and the second layer 14 is in tension. The composite fiber material of the first layer 12 has a low compressive modulus and the fibers elastically buckle under compression, such that the flexibility allows for a much greater bending of the assembly 10 in the upward direction in response to the same bending loads as the inverted response. In one embodiment, the compressive modulus of the first layer 12 is sufficiently low such that it provides a negligible resistance to bending of the assembly 10 in the upward direction (i.e., when the first layer 12 is in compression). Accordingly, the assembly 10 provides an anisotropically-flexible beam with greater resistance to bending in one direction (i.e., when the first layer 12 is in tension) than in the other direction (i.e., when the first layer 12 is in compression and elastically buckles).

Figure 4:
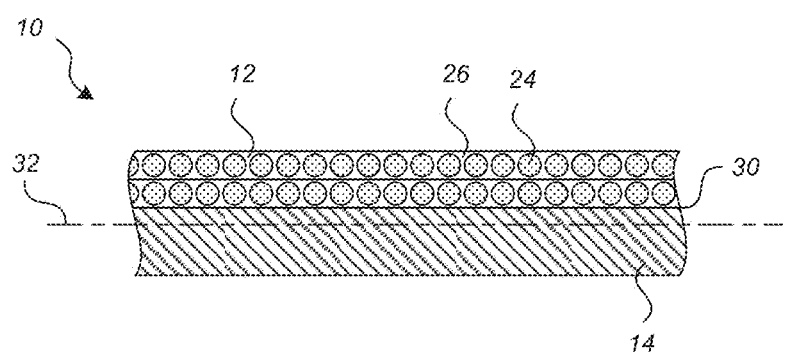
FIG. 4 is an enlarged cross sectional view taken substantially along line 4-4 of FIG. 1A showing the top and bottom layers of the assembly in accordance with an embodiment of the present technology.

FIG. 4 is an enlarged partial cross sectional view taken substantially along line 4-4 of FIG. 1A showing the first and second layers 12 and 14 of the assembly 10 in accordance with an embodiment of the present technology. The illustrated first layer 12 includes a non-rigid carbon fiber-reinforced composite material having two layers of fiber materials joined together. The thickness of the first layer 12 is substantially the same as the thickness of the second layer 14. In other embodiments, the first and second layers 12 and 14 can have different thicknesses. The first layer 12 is permanently affixed to the second layer 14 at a middle interface area 30. The illustrated assembly 10 can be configured with a neutral bending plane 32 substantially parallel to the interface area 30. When the assembly 10 is bent upwardly, so the first layer 12 is in compression with the fibers buckling, the first layer 12 provides a substantially negligible resistance to bending. The neutral bending plane 32 is close to the middle of the second layer 14, which provides low bending resistance to allow the assembly 10 to bend upwardly. When the assembly 10, however, is bent downwardly so the first layer 12 is in tension, the neutral bending plane 32 moves closer to the interface area 30. The fibers in the first layer 12, when in tension, provide much more bending resistance relative to downward bending of the assembly 10.

The assembly 10 can be tuned by selecting and controlling the materials of the first and second layers 12 and 14 to provide the anisotropic bending characteristics. For example, the characteristics can be controlled by changing the number of sheets of fibers in the laminate in the first layer, its matrix material, the weave of the fibers, the interstitial layer material, the film material, fiber type(s), fiber content, areal density of the fiber(s), etc. When the second layer 14 is a rigid composite fiber material, the bending characteristics of the second layer 14 can also be tuned by controlling the constituents of the layer, including the layers of fiber, weave, matrix, etc. In other embodiments, the second layer 14 can be made of other materials, such as metals, plastics, or other material selected for tuning of the layer or the assembly. In one embodiment, the second layer 14 can be formed of shaped and/or perforated metal, plastic, or other suitably rigid material.

Different configurations and combinations of carbon fiber materials can be advantageously used in constructing the anisotropically-flexible assembly. FIGS. 5-8 are graphs 34, 36, 38, 40 showing the differences between flexural moduli in exemplary testing configurations. The x-axes represent strain in units of inches per inch (in/in). The y-axes represent stress in pounds per square inch (psi).

Figure 5:
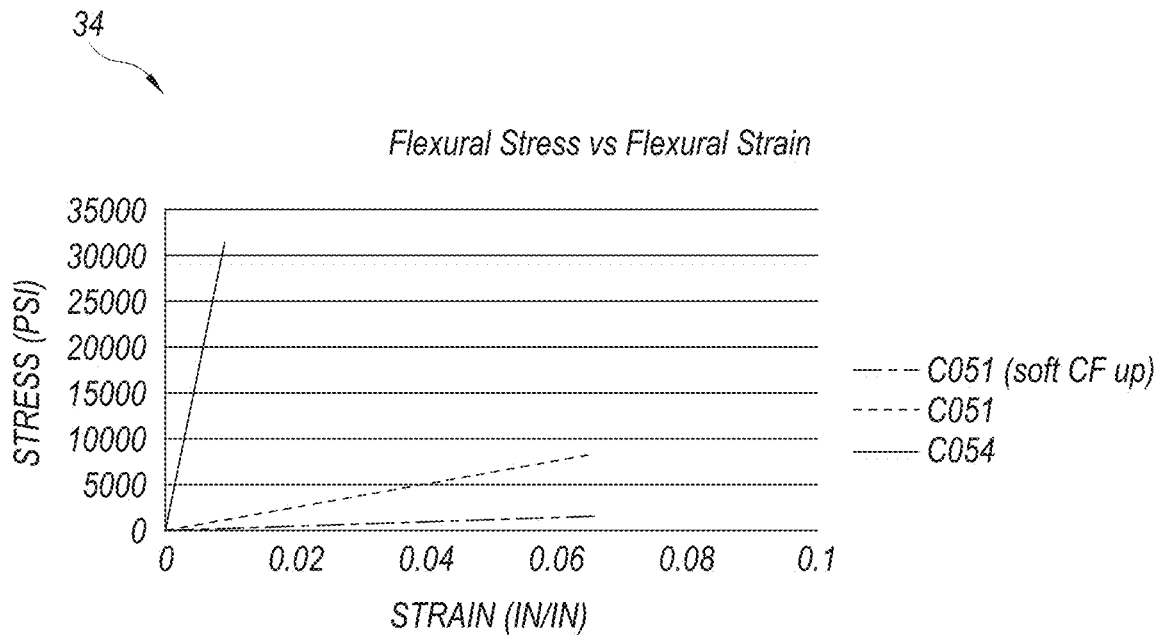
FIGS. 5-8 are graphs showing, by way of example, the differences between flexural moduli in exemplary testing configurations.
Figure 6:
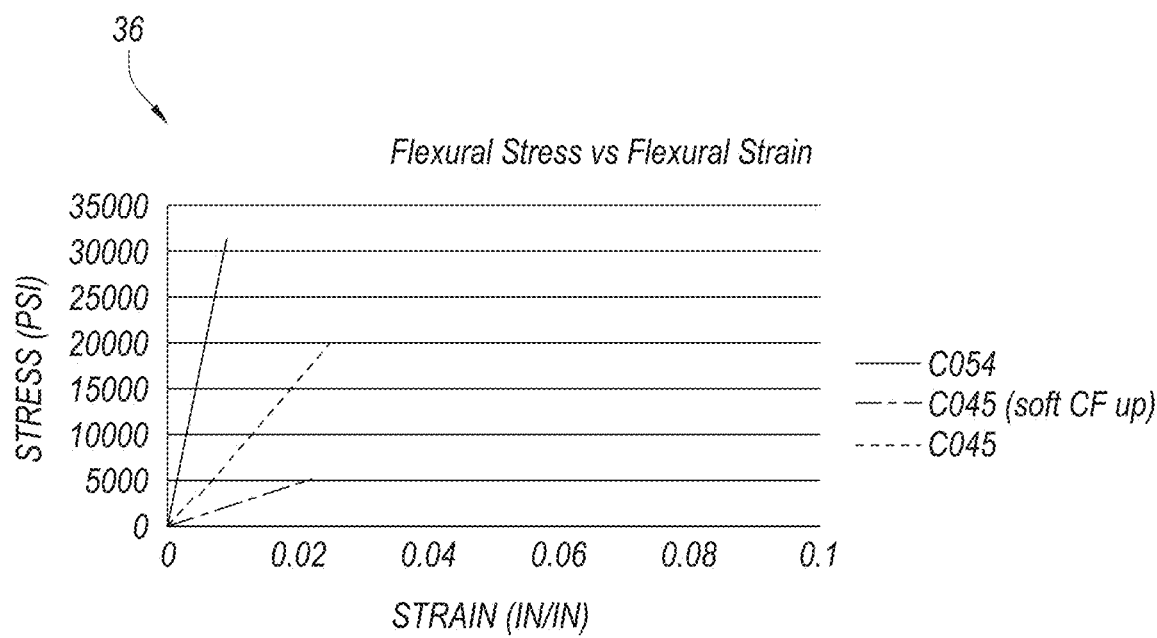
Figure 7:
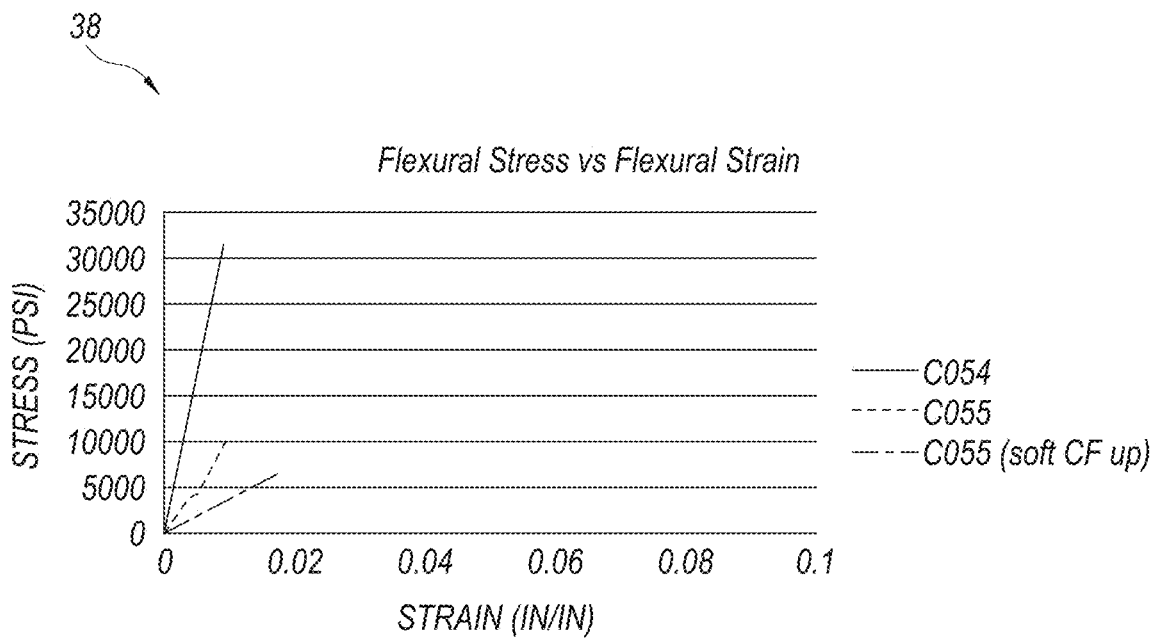
Figure 8:
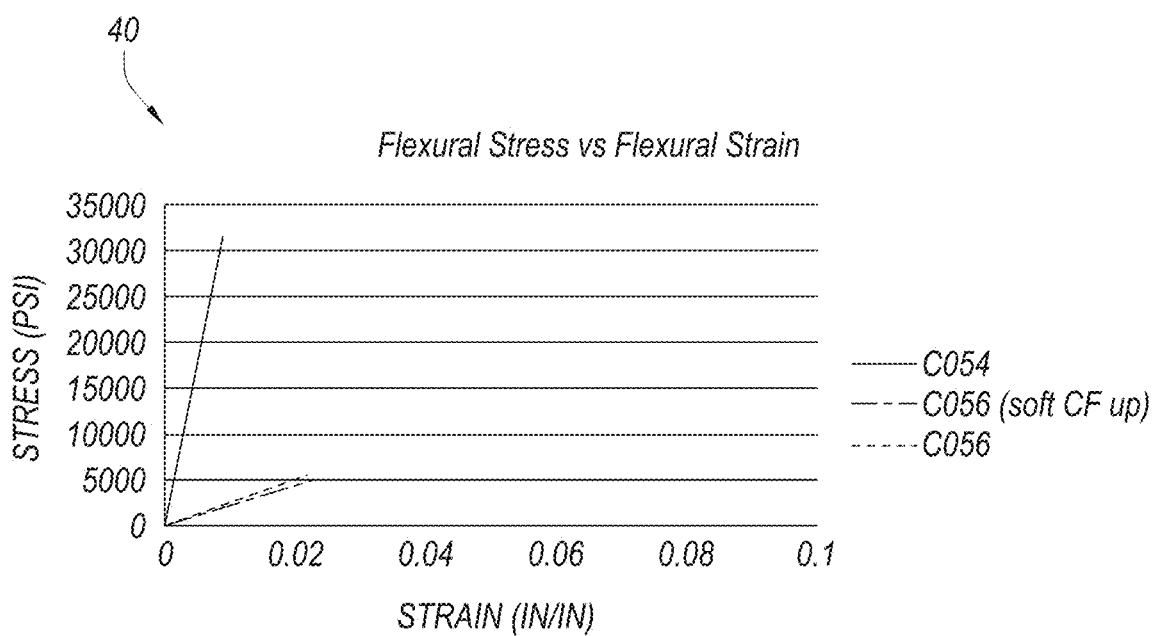

Referring to FIG. 5, the flexural modulus (i.e. bending stiffness) for the non-rigid side (i.e., the first layer 12) in compression is 17,700 psi, and the non-rigid side in tension is 117,000 psi, which is roughly a 6.6:1 change its flexural modulus based on bending direction. Referring to FIG. 6, a configuration that uses a single layer of non-rigid carbon in the first layer 12 has a flexural modulus for the non-rigid side in compression of 177,000 psi and the non-rigid side in tension of 808,000 psi, which is roughly a 4.6:1 change in flexural modulus based on bending direction. Referring to FIG. 7, shifting the fabric in the first layer 12, such that the angle between the warp and weft fibers 24 and 26 (FIG. 1) is greater or less than 90 degrees, can increase the flexural modulus of elasticity in both the non-rigid compression and tension values to 348,000 psi and 1,240,000 psi respectively, which is roughly a 3.6:1 change in flexural modulus based on bending direction. Referring to FIG. 8, the shifted fabric in bending was tested to evaluate the transverse direction of the beam bending with little difference with the shifted fabric at 70 degrees to the off-axis, whether in tension or compression with flexural modulus values of 27,700 psi and 24,400 psi respectively.

Figure 9:
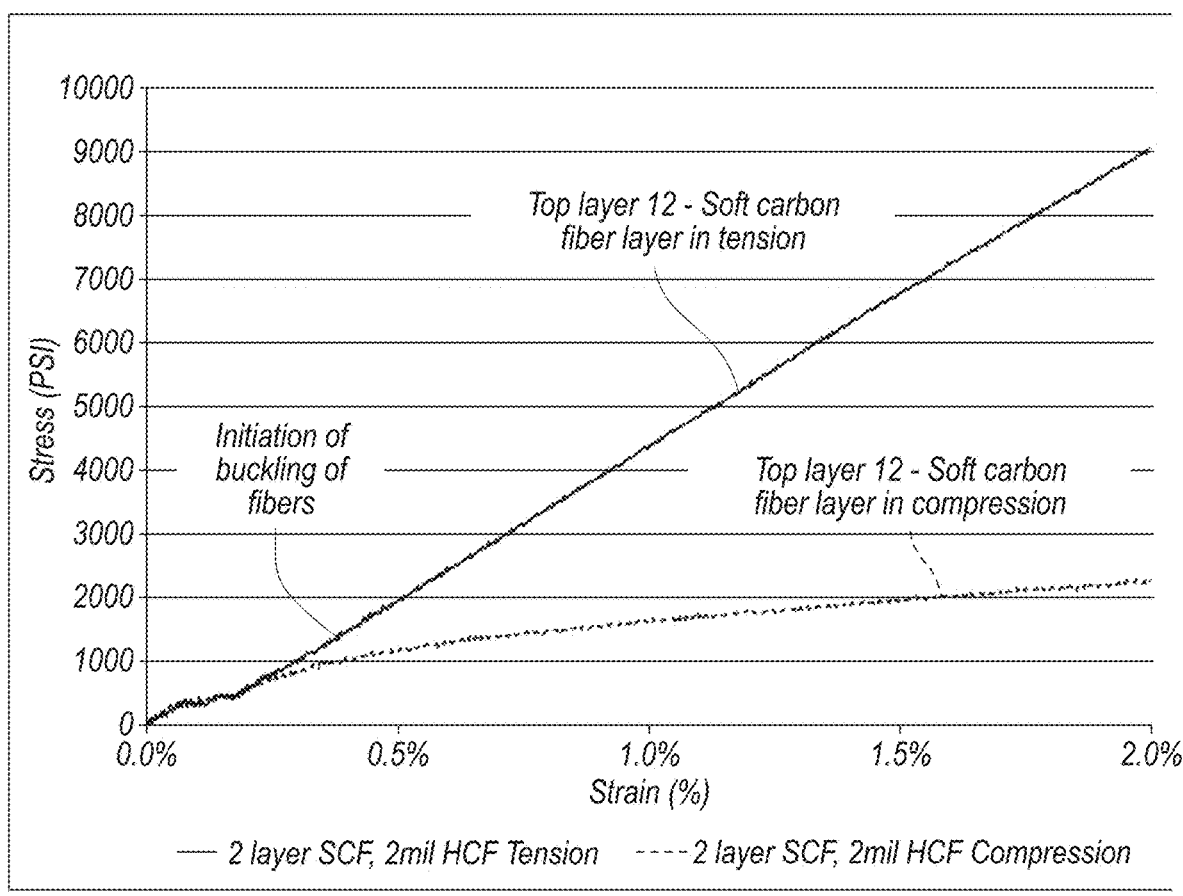
FIG. 9 is a graph showing, by way of example, the flexural moduli of an assembly in tensions and compression.
Figure 10:
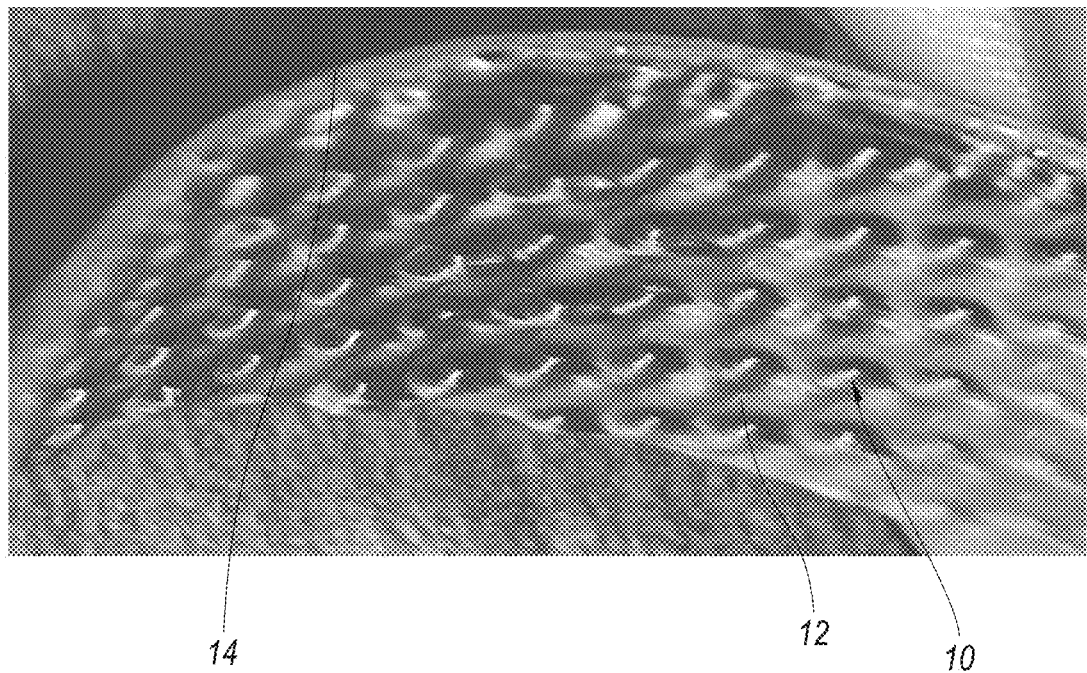
FIG. 10 schematic illustration showing, by way of example, controlled buckling in a non-rigid carbon fiber material under compression.

FIG. 9 illustrates a graph 42 showing the stress-strain relationship of an embodiment of the assembly having a two layer, non-rigid carbon-fiber fabric configuration in compression and in tension. The graph illustrates the stress-strain relationship of the assembly with the first layer 12 in compression and the initiation of the elastic deformation and buckling of the fibers in the non-rigid carbon fiber material. The flexural rigidity in the range of motion can be tuned through variation in moduli combinations. The moduli can be changed based on resin matrix moduli and fabric weave pattern. FIG. 10 illustrates controlled buckling in the first layer 12 formed by a non-rigid carbon fiber material under compression. By changing the matrix modulus, the buckling resistance will change, therefore changing the compression modulus of the material. The matrix moduli can vary between less than 5 psi to greater than 3,000 psi. The matrix content can also be controlled by coating, impregnating, or encapsulating the fibers with different quantities of matrices. For example, a matrix material can be a dispersion that completely coats, impregnates or encapsulates all of the fibers with a low modulus resin and provides a weight gain of up to 50%, and conversely a dry fiber with no binder can be used as the other extreme. This range provides a different effective modulus in tension and compression that is offered because of a binder that fuses the fiber bundles together in random locations, while the other locations are considered to be dry fiber, whereas the air in the space is the lower modulus matrix.

The compression modulus also changes based on the weave density in the fabric combined with the resin matrix modulus. Weave densities change the spacing of the transverse tows, thereby changing the column length for buckling in the longitudinal direction. For example, a 268 gsm fabric will have approximately 16 tows per inch, which yields a tow spacing of 0.0625 inches and with a 2×2 twill pattern gives a 0.125 inch column length. A 200 gsm fabric will be 12.5 tows per inch, which yields a tow spacing of 0.080 inches and with a 2×2 twill pattern gives a 0.160 in. column length. Shorter column lengths increase the compression modulus and longer column lengths decrease the modulus. The size of the fiber tows can also be construed to offer columnar stiffness, whereas a fiber tow size of 24K would have higher columnar stiffness than a 12K and whereas a 3K would offer a lower columnar stiffness than the 12K and so on. The tow size effectively changes the columnar diameter based on the size of the tow.

Referring to Table 1 (below), two sheets of 268 gsm fabric 2×2 twill with 6% binder content joined to a rigid carbon fiber composite substrate has a flexural modulus for E100 on the non-rigid side compression is 59,700 ksi and the non-rigid side in tension is 454 ksi, which is roughly a 7.6:1 change in modulus based on bending direction. A configuration that uses a single layer of non-rigid carbon in the first layer 12 has a flexural modulus for E099 on the non-rigid side compression of 295.8 ksi and the non-rigid side in tension of 875.7 ksi, which is roughly a 2.96:1 change in modulus based on bending direction.

Shifting the fabric (see FIG. 8) can increase the modulus in both the non-rigid side compression and tension values to 348 ksi and 1,240 ksi respectively, which is roughly a 3.6:1 change in modulus based on bending direction.

bending direction. In comparison, E276 in Table 1 having a single layer of 268 gsm fabric 2×2 twill with 6% binder content forming the first layer 12 joined to a titanium substrate forming the second layer 14 has a flexural modulus with the non-rigid side in compression of 2930 ksi and with the non-rigid side in tension of 3703.8 ksi, which is roughly a 1.3:1 change in modulus based on bending direction.

Referring to Table 1, two sheets of 268 gsm fabric 2×2 twill with 6% binder content forming the first layer 12 joined to a polycarbonate substrate forming the second layer 14 has a flexural modulus for E275 with the non-rigid side compression of 26.9 ksi and the non-rigid side in tension of 172 ksi, which is roughly a 6.4:1 change in modulus based on bending direction compared to E277 in Table 1, two sheets of 268 gsm fabric 2×2 twill with 6% binder content forming the first layer 12 joined to a titanium substrate forming the second layer 14 has a flexural modulus with the non-rigid side in compression of 808.5 ksi and with the non-rigid side in tension of 1506.5 ksi, which is roughly a 1.86:1 change in modulus based on bending direction.

In a further embodiment, the assembly 10 can be constructed as a resin matrix and fiber weave material. The weave pattern on the first layer 12 with a low compression modulus has one compression modulus in one direction and a different compression modulus in a direction transverse to the first modulus in the same plane. This configuration allows the anisotropically-flexible beam to be flexed differently in the two planes. For example, a 2×2 twill fabric can have 16 tows per inch in the longitudinal direction and 12 tows per inch in the transverse direction, thereby changing the columnar spacing that provides two different compression modulus by different buckling points.

Figure 11A:
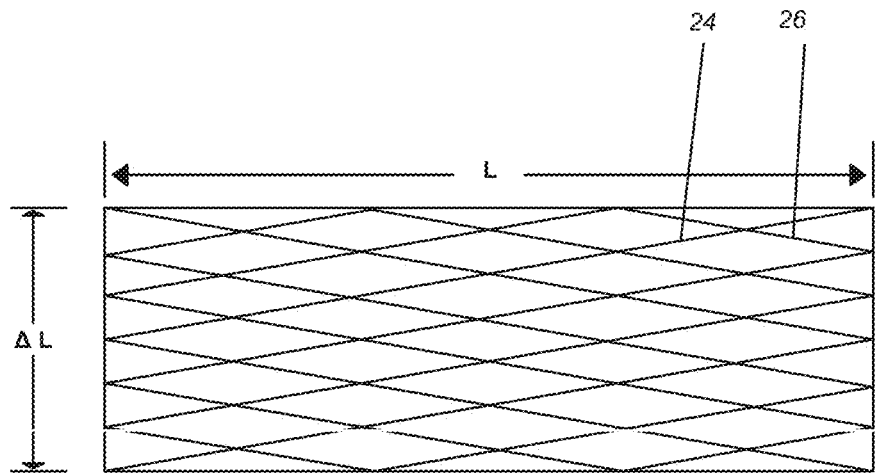
FIGS. 11A and 11B are illustrations showing, by way of example, changes in fiber orientation when composite fiber material in the assembly of FIG. 1A is strained along the longitudinal axis of a segment of the material in accordance with an embodiment of the present technology.
Figure 11B:
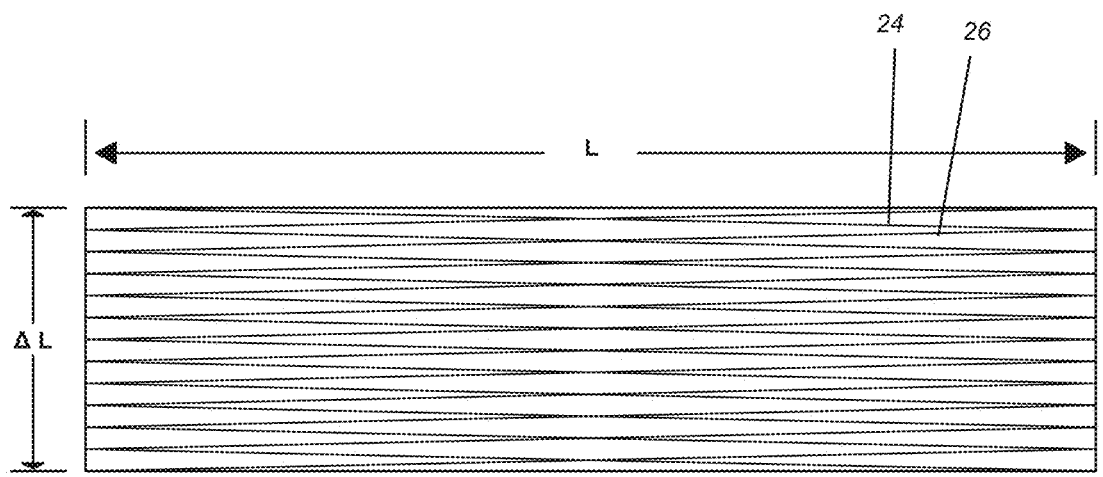

In a still further embodiment, the assembly 10 can be constructed as a weave pattern with differing compression moduli based on weave direction. This material changes layer orientations of the material of the first layer 12 to provide variable stiffness. FIGS. 11A and 11B are illustrations showing, by way of example, changes in fiber orien-

TABLE 1

| | 1 Layer SCF, 20 mil HCF E099 | 2 Layer SCF, 20 mil HCF E100 | 1 Layer SCF, 20 mil PC E274 | 2 Layer SCF, 20 mil PC E275 | 1 Layer SCF, 20 mil Ti E276 | 2 Layer SCF, 20 mil Ti E277 |
|---|---|---|---|---|---|---|
| Flexural Modulus, Non-rigid Side in Tension 1.5-2% Strain (ksi) | 875.666 | 454.009 | 209.142 | 172.011 | 3703.806 | 1506.468 |
| Flexural Modulus, Non-rigid Side in Compression 1.5-2% Strain (ksi) | 295.846 | 59.670 | 55.994 | 26.941 | 2930.097 | 808.471 |
| Modulus Ratio | 2.960 | 7.609 | 3.735 | 6.385 | 1.264 | 1.863 |

Also a 268 gsm fabric 2×2 twill with 6% binder content comparing different rigid substrates and 1 and 2 sheets of non-rigid carbon fiber demonstrates the versatility and range of control of modulus levels one can obtain. Referring again to Table 1, a single layer of 268 gsm fabric 2×2 twill with 6% binder content forming the first layer 12 joined to a polycarbonate substrate forming the second layer 14 has a flexural modulus for E274 with the non-rigid side in compression of 56 ksi and the non-rigid side in tension of 209.1 ksi, which is roughly a 3.7:1 change in modulus based on tation when material is strained along the longitudinal axis of a simple beam. As disclosed in Applicant's U.S. patent application Ser. No. 15/135,455, when the fibers undergo tensile strain, the fibers align themselves in the tension direction; conversely, when the fibers are in compression and they shift into a more transverse direction causing the compression modulus to shift lower. When the assembly 10 is configured with the first layer 12 having a shifted fabric arrangement, the dynamic fiber orientation during flexing causes the beam to become stiffer as the beam is flexed. The assembly 10 becomes stiffer as the deflection increases. Accordingly, the asymmetric beam material composition can be modified or tuned to change performance. The various embodiments utilize a composite material design with combinations of high tensile modulus in tension and low compression modulus material in compression to provide a highly flexible one way beam, and conversely a highly rigid beam with opposite loading.

The assembly 10 forming the anisotropically-flexible beam can be used in a wide variety of products or applications. For example, the assembly 10 can be used to form a component in an article of footwear 50 shown in FIG. 12. It is known that the potential for injury to a wearer's foot often increases with increased flexibility. The protection of the foot via the footwear's sole assembly can be reduced through the use of non-rigid material that allows the traditional shoe to have greater flexibility. To counter such potential reduced protection, the assembly 10 can be used as a component of the footwear's sole assembly or as an insole that provides anisotropic bending and that can provide a rigid, thin substrate layer that can laterally dissipate forces applied to the bottom or plantar side of the foot, thereby helping to protect it from injury. The assembly 10 can also be incorporated into footwear to provide increased flexibility substantially without sacrificing stability and protection. The resulting combination can decrease or even eliminate user fatigue by incorporating an anisotropically-flexible sole component into the footwear.

Figure 13:
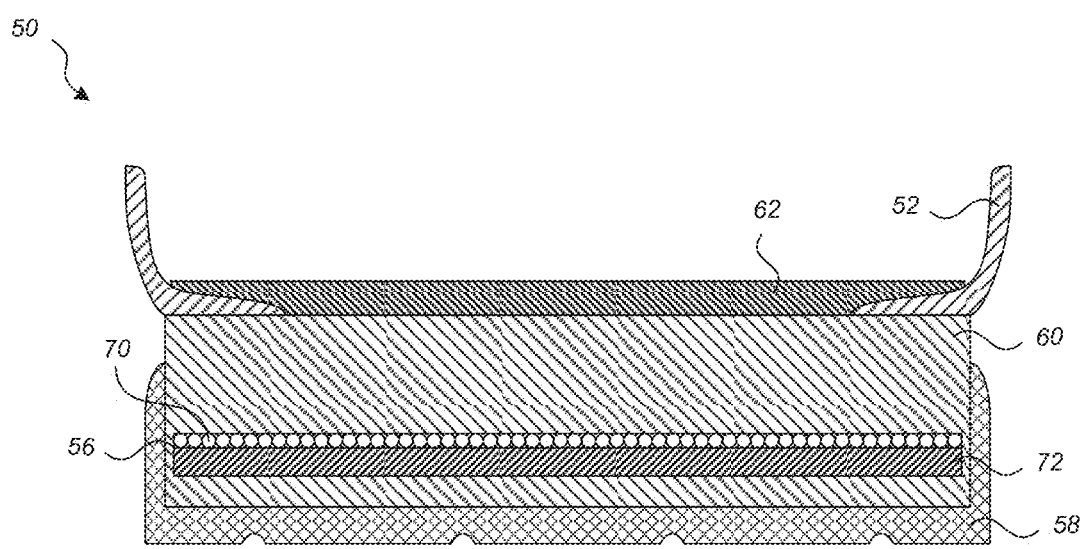
FIG. 13 is a schematic cross-section of the sole assembly of FIG. 12 in accordance with one embodiment.

The illustrated article of footwear 50 has an upper 52 shaped to receive a foot of a wearer. The footwear 50 can be a shoe, including a dress shoe, casual/life-style shoe, running shoe, cleated shoe, other athletic shoe, Oxford shoe, or other type of shoe. The footwear 50 can also be a boot, sandal, or other the like. The upper 52 is fixedly attached along the bottom margin to a sole assembly 54. The illustrated sole assembly 54 has one or more internal joined plate assemblies 56 made of the assembly 10 of FIG. 1A in accordance with an embodiment of the present technology. FIG. 13 is a schematic cross-sectional view of the sole assembly 54 with the joined plate assembly 56 shown relative to a wearer's foot. The illustrated sole assembly 54 includes an outsole 58 attached to the bottom portion of a midsole 60. The sole assembly 54 can include an insole board 62 attached to the top of the midsole 60 and positioned to support the upper 52. The plate assembly 56 is attached to the midsole 60 and can be shaped and sized to extend fully underfoot from a forefoot portion 64 through an arch portion 66 to a heel portion 68. The plate assembly 56 can be a one piece, full foot plate, although the plate assembly 56 in other embodiments can include one or more segments positioned in the forefoot portion 64, arch portion 66 and/or heel portion 68. The segments can be connected to each other or spaced apart when multiple segments are provided in the sole assembly 54.

The plate assembly 56 is shown embedded within the midsole 60. The plate assembly 56, however, can be positioned between the bottom of the midsole 60 and the outsole 58. In another embodiment, the plate assembly 56 can be positioned between the insole board 62 and the midsole 60. In yet another embodiment, the plate assembly 56 can be positioned atop the midsole 60 forming the insole board 62.

The plate assembly 56 is made with the joined construction having the anisotropic bending behavior during flexing to provide a low bending resistance during flexing of the sole in the dorsal flex direction (i.e., upward bending) and a high bending resistance in the plantar flex direction (i.e., downward bending). The anisotropically-flexible plate assembly 56 includes a dorsal layer 70 and a plantar layer 72, both of which are constructed from two different types of flexible material. The dorsal layer 70 is defined by the first layer 12 of the assembly 10 as discussed above, and a plantar layer 72 defined by the second layer 14 of the assembly 10 as discussed above. The material used in the dorsal layer 70 has a low modulus of elasticity in compression and a high modulus of elasticity in tension. The dorsal layer 70 is tuned to limit longitudinal deflection in the plantar direction. The material used in the plantar layer 72 has a rigid material whose modulus of elasticity can be greater than, less than, or equal to the modulus of elasticity in tension of the flexible material of the dorsal layer 70. The plate assembly 56 is configured to provide simultaneous improvements in stability, flexibility, and protection not currently available in footwear.

Conventional footwear soles traditionally focus in one area of improvement at the sacrifice of another. For instance, a running shoe may increase flexibility and cushioning at the sacrifice of stability and protection. The increased flexibility is commonly achieved through outsole and midsole design that provides segments in the sole in flexing regions of the shoe. While this does increase flexibility, the torsional stiffness can be considerably reduced, and the plantar flex protection can be substantively sacrificed. Another instance is a hiking boot that often sacrifices flexibility for increased protection and stability. The use of rigid materials in the construction of the sole of the hiking boot increases the stiffness while preventing foot bruising from rocks or roots on the hiking trail.

The assembly 10 in the form of the plate assembly 56 of the present technology allows for highly tunable bending flexibility without the sacrifice of the stability and protection. In one embodiment, the dorsal layer 70 is laminated or otherwise securely joined to the plantar layer 72, such that when the dorsal layer 70 is under compression when bending in the dorsal flex direction, the dorsal layer 70 has a low compression modulus and can bend easily. Accordingly, the plate assembly 56 does not provide too much dorsiflexive bending resistance, such as during the transition from the flat foot stage of a stride through toe-off stage during which the wearer's foot naturally bends at the metatarsal joints. Conversely, when forces on the sole assembly 54 bend the plate assembly 56 in the opposite, plantar flex direction, the dorsal layer 70 is under tension and has a high modulus that can significantly resist such bending. The laminate construction of the plate assembly 56 also provides stability during a wearer's gait cycle by controlling the dorsiflexive motion that helps eliminate the foot's tendency to want to roll inward or outward (pronate and supinate). The increased flexibility helps reduce the forces required by the foot to flex the footwear 50, thereby reducing fatigue which can help increase stability.

During use of the footwear 50, such as running, walking, hiking, climbing ladders, etc., the sole assembly 54 is often subjected to uneven surfaces such as rocks, sidewalk cracks, sticks, ladder rungs, or other sources of unevenness that can create localized forces applied to the bottom of the wearer's foot. These localized forces can bruise the foot or cause soreness or other discomfort. The sole assembly 54 with the integrated anisotropic plate assembly 56 provides a rigid support that laterally displaces the localized forces through a high resistance to bending in the plantar flex direction.

Figure 14:
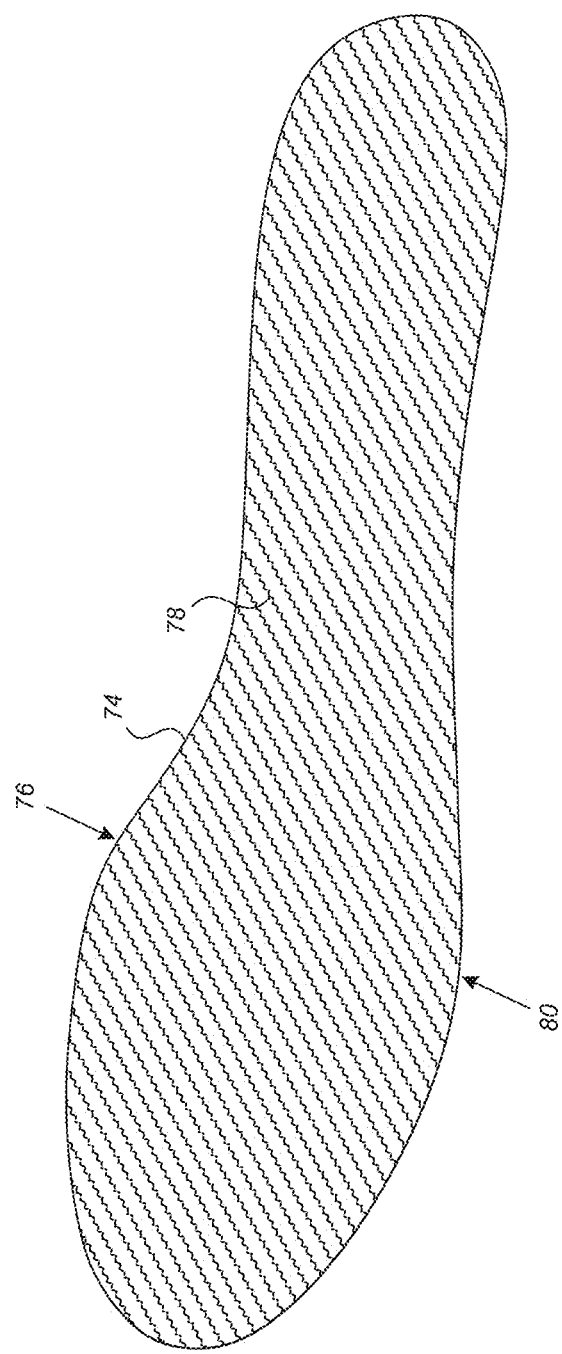
FIG. 14 is a schematic isometric view of a shoe insole made with a joined, fiber-reinforced composite material assembly with tunable anisotropic properties in accordance with an embodiment.

In another embodiment illustrated in FIG. 14, an insole 76 insertable into the footwear's upper 52 (FIG. 12) can include a plate assembly 74 with one or more portions having a construction substantially similar to the assembly 10 discussed above. The insole 76 can be removably inserted within the upper 52 or it can be fixedly attached to the bottom portion of the upper 52. The insole 76 can be a generally planar insole. In another embodiment, the insole 76 can be a molded orthotic insole that at least generally conforms to the shape of a wearer's foot. The insole 76 can be a full-length insole extending under the forefoot, arch, and heel portions of the wearer's foot. In other embodiments, the insole 76 can be less than a full length insole, such as a three-quarter-foot or half-foot insole.

The plate assembly 74 of the insole 76 has a dorsal layer 78 defined by the first layer 12 of the assembly 10 and that includes a flexible material exhibiting a modulus of elasticity tuned to limit longitudinal deflection in the plantar direction. The insole 76 also has a plantar layer 80 fixedly attached to the dorsal layer 78 and configured to fit snuggly against the top of the footwear's sole assembly. The plantar layer 80 includes the woven fibers within a matrix comprising another flexible material exhibiting a modulus of elasticity that is comparatively higher than the modulus of elasticity of the flexible material of the dorsal layer 78. The bottom of the insole 76 comprising the plantar layer 80 can be configured to generally provide cushioning of the foot, whilst the top of the insole 76 comprising the dorsal layer 78 protects the foot against chafing, as well as providing a lesser degree of cushioning. Alternatively, the insole 76 could be constructed with just a single layer of rigid substrate on the dorsal side and two sheets or more of a flexible composite substrate on the plantar side that provides further flexibility. In one embodiment, the insole 76 can have one or more durable cushioning and/or wear sheets attached to the dorsal layer 78 and/or the plantar layer 80 to provide additional comfort for the wearer's foot during use.

Figure 12:
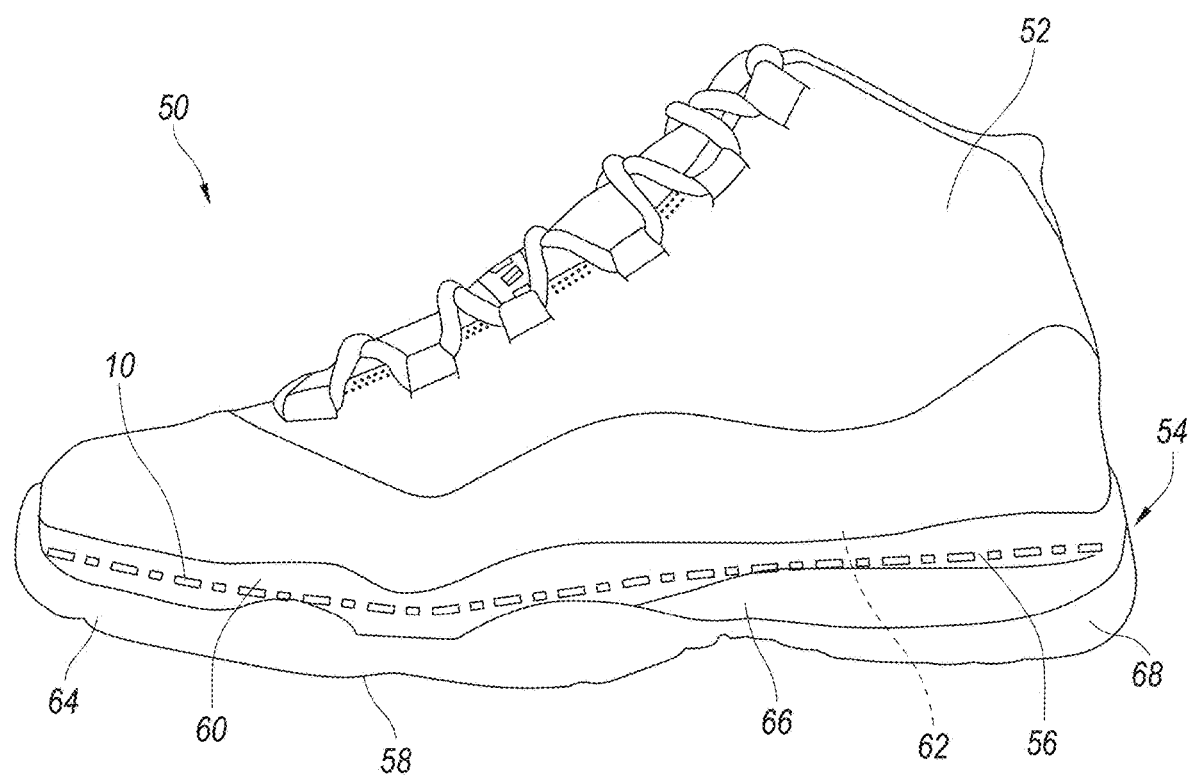
FIG. 12 is a schematic side view of an article of footwear with a sole assembly that includes a laminate plate made of the assembly of FIG. 1A.

In the embodiments illustrated in FIGS. 12-14, the plate assembly 56 and the insole 76 are generally planar assemblies with a flat neutral orientation when the bending forces are not acting on the assembly 10. Accordingly, when the assembly 10 is in the neutral orientation (shown in a substantially horizontal orientation), the dorsal layer 70/78 and the plantar layer 72/80 are substantially not in tension or compression. When bending forces are applied to the flat assembly 10 to cause bending away from horizontal, the dorsal layer 70/78 and the plantar layer 72/80 are in compression or tension depending on the direction in which the assembly 10 is bent away from the neutral orientation.

The assembly 10 with the directional bending stiffness can be utilized in other applications to achieve the benefits of a low resistance to bending in one direction and a high resistance to bending in the other direction. For example, the assembly 10 could be incorporated into athletic equipment to improve the athlete's on-field performance and reduced fatigue by incorporating such materials into their equipment. The assembly 10 could be incorporated into baseball gloves and/or soccer goalie gloves. When glove fingers, for instance, are pulled in the inward direction, the glove fingers are easily flexed, while if the fingers are bent backwards toward the back of the hand, the fingers of the glove are more rigid to resist the bending. A baseball catcher or soccer goalie, for instance, could integrate the material into their respective forms of gloves, whereby the increased stiffness is used advantageously to help cushion impact, whilst the increased flexibility aids with gripping action and easy closure. The asymmetric beam configuration of the assembly 10 can protect an athlete, for instance, against hyperextension of their fingers when stopping a soccer ball or a baseball glove that allows easy closure, as well as provide stiffness in glove finger areas with which to stop balls thrown at high velocity. The asymmetric beam configuration of the assembly 10 could also be incorporated into joint areas of prosthetics, into back or articulating braces and supports, or into other medical devices or medical appliances.

The assembly 10 in accordance with other embodiments can be used as a protective member that protects a user's excessive bending in an undesired bending, while allowing bending in the opposite direction. For example, movement of the limbs and joints of the body outside of their expected range of motion is known as hyperextension, which refers to movement beyond normal limits of angular, rotational or gliding motion, depending upon the anatomical structures involved. The assembly 10 can also be used in footwear, such as soccer, rugby, or football shoes, configured to flex and bend with a user's foot in one direction during a normal running or walking stride, while maintaining stiffness and resistance to bending in the opposite direction, such as while kicking a soccer ball, rugby ball, or football. Accordingly, when a player kicks the ball, the shoe remains substantially stiff so as to impart greater loads or forces to the ball. One or more embodiments of the assembly 10 can be specifically tuned for particular athletic events, and/or for particular athletes or other users. For example, the assembly 10 could be used in footwear and tuned based upon an athlete's particular individual musculoskeletal characteristics, such as metatarsophalangeal (MTP) range of motion and extension velocity while running, so as to provide a progressive bending stiffness for the athlete to enhance the athlete physical performance. For example, footwear for an athlete with a lager MTP extension could include an assembly 10 tuned to provide a progressive increase in bending stiffness to help maximize individual performance. Tuning of shoes for stiffness to a runner's particular characteristics can be provided to maximize performance. Assembly 10 will adjust the stiffness to different phases of a running (acceleration, sprinting, and jogging) to optimize performance. For example, a shoe with a progressive stiffness that exhibits low gearing in the initial acceleration and transitions to a higher gearing at the top speed phase of the run.

Hyperextension can result in physical injury due to the increased stress and forces applied to ligaments and connective tissues. Hyperextension often occurs in concert with physical or sports activities, but can also develop over time through chronic or repetitive overuse of some part of the body. For example, lateral epicondylitis or "tennis elbow," is caused by the repetitive use of the extensor muscles of the forearm and is commonly associated with playing tennis, but the condition has also been called "washer woman's elbow," reflective of an age when clothes washing was performed as a manual vocation. On the same note, chondromalacia patellae or "runners knee," is the increased deterioration and breakdown of the cartilage under the kneecap due to an overworking of the knee, often due to running, but could be attributed to gymnastics, cycling, horseback riding, ballet, and even swimming. Finally, metatarsophalangeal joint sprain or "turf toe," occurs when the toes of the foot are hyperextended, as often occurs in professional sports that are played on artificial turf, especially football, but has been observed in soccer, rugby, and volleyball, and even in non-field sports, like basketball and taekwondo.

Taking "turf toe" as a specific example, the risk of incurring a metatarsophalangeal joint sprain increases with the angle of longitudinal deflection at the metatarsal phalangeal joint. A sprain can occur with the hyperextension of any of the toes, although the big toe normally suffers injury, as the bulk of forward dorsiflexive motion is borne by that toe. This type of injury with the metatarsal phalangeal joint region of the foot includes the ligaments and connective tissues that join the ball of the foot with the toes. The metatarsal phalangeal joint can be injured if the back of the calf is pushed forward whilst the knee and toes are in contact with the ground. Injury can also happen when the cleats of an athletic shoe grip into artificial turf and fail to release the foot when the individual is running or walking. The forward momentum of the body causes the foot to bend too far forward at the metatarsal phalangeal joint while the toes are still held firmly in place by the turf, resulting in hyperextension of the toes.

The risk of incurring injury due to hyperextension can be significantly decreased through the use of protective equipment that cushions from damage or restricts or limits the movement of the various limbs and joints of the body, whether elbows, wrists, fingers, knees, ankles, toes, hips, or other anatomical structures, to their normal range of expected motion. For instance, existing measures for protecting against turf toe are lacking. For example, U.S. Pat. No. 5,772,621 discloses a turf toe brace that includes a flexible boot adapted for snugly anchoring the brace to a foot, an elongate non-stretchable strap joinable to the boot, and a toe loop that is joined to the strap opposite the boot. In use, the strap passes under the foot and is connected to the boot in such a manner as to pull downwardly on the big toe and help prevent hyperextension, whilst the other four unrestrained toes remain at risk of hyperextension. As well, the brace requires enough clearance in the ankle region to fit within a shoe. Last, the strap could become undone during use, thereby obviating any protective benefits.

U.S. Patent Appl. Pub. No. 2012/0240431 discloses a turf toe terminator, which is a semi flexible shoe insert that is inserted into a cleat or sneaker, or is created as part of a shoe, to help prevent injury due to hyperextension of the big toe. A nylon strap is attached to the toe and heel of a polypropylene plastic shoe insert using nylon string. The nylon strap is attached under tension to generate an inverted arch in the shoe insert, which helps provide support to a hyperextended big toe. During use, when the toes are forced upward, the nylon strap of the shoe insert prevents the toes from extending to hyperextension and transfers pressure from the toes to the heel of the shoe by pushing downward. However, the strap is attached to the shoe insert with string and is therefore susceptible to breakage. Moreover, the shoe insert is primarily focused on protecting the big toe with only incidental hyperextension prevention being provided to the other toes of the foot.

Accordingly, there is a need for a shoe, shoe insert or foot support that will safeguard all of the toes of the foot from hyperextension while allowing bending of the toes through the normal range of motion without reaching the point of hyperextension. There is a further need for a protective equipment that keeps body motion, not just the toes, within a normal range of expected motion without restricting normal free movement up to the limits of hyperextension.

At least one embodiment of the assembly 10 of the present technology is configured to significantly decrease or eliminate the risk of turf toe or other metatarsophalangeal joint sprain to all of the toes by incorporating an anisotropically-flexible area into the flex region 110 of the footwear under the metatarsal phalangeal joints of the foot. The anisotropically-flexible area is incorporated into a shoe insert, insole, midsole or outsole and is separated into a dorsal side and a plantar side, both of which are constructed from two different types of flexible material. The material used in the plantar side has a variable modulus of elasticity tuned to limit longitudinal deflection based on angular deflection levels in the dorsal direction based on angular rotation of the metatarsal phalangeal joint, that is, forward dorsiflexive motion, while the material used in the dorsal side has a modulus of elasticity that is comparatively higher than the variable modulus of elasticity of the flexible material of the plantar side.

One embodiment provides a tuned plate assembly made of the assembly 10 and incorporated within the shoe sole assembly or provided as an insole shaped to fit within the bottom part of a shoe. The tuned plate assembly 10 has an anisotropically-flexible area situated for placement under the metatarsal phalangeal joint region of the foot. The assembly 10 provides a shoe sole and/or insole with a flexural modulus that increases as a function of increasing bend angle relative to the neutral orientation.

Furthermore, in the foregoing embodiments, the tuned plate assembly may also be configured with a dorsal side exhibiting a variable modulus behavior, such that the modulus increases as angular rotation (dorsiflexion) of the metatarsal phalangeal joint region occurs, where the mechanism creating the dorsal variable modulus is a compressive layer engagement that coincides with dorsiflexion of the metatarsal phalangeal joint.

The directional bending stiffness described herein can be utilized in footwear-related applications, such as shoe inserts, articles of footwear with a shoe insert, articles of footwear with a midsole, articles of footwear with an outsole, and articles of footwear, requiring a varying resistance to bending in the dorsal direction based on angular rotation of the metatarsal phalangeal joint. The directional bending stiffness can also be utilized in applications that provide protective equipment to keep body movement within a normal or constrained range of expected motion without restricting normal, free movement up to the limits of hyperextension, such as needed in the joint areas of prosthetics, back or articulating braces and supports, and articulating braces.

Figure 15:
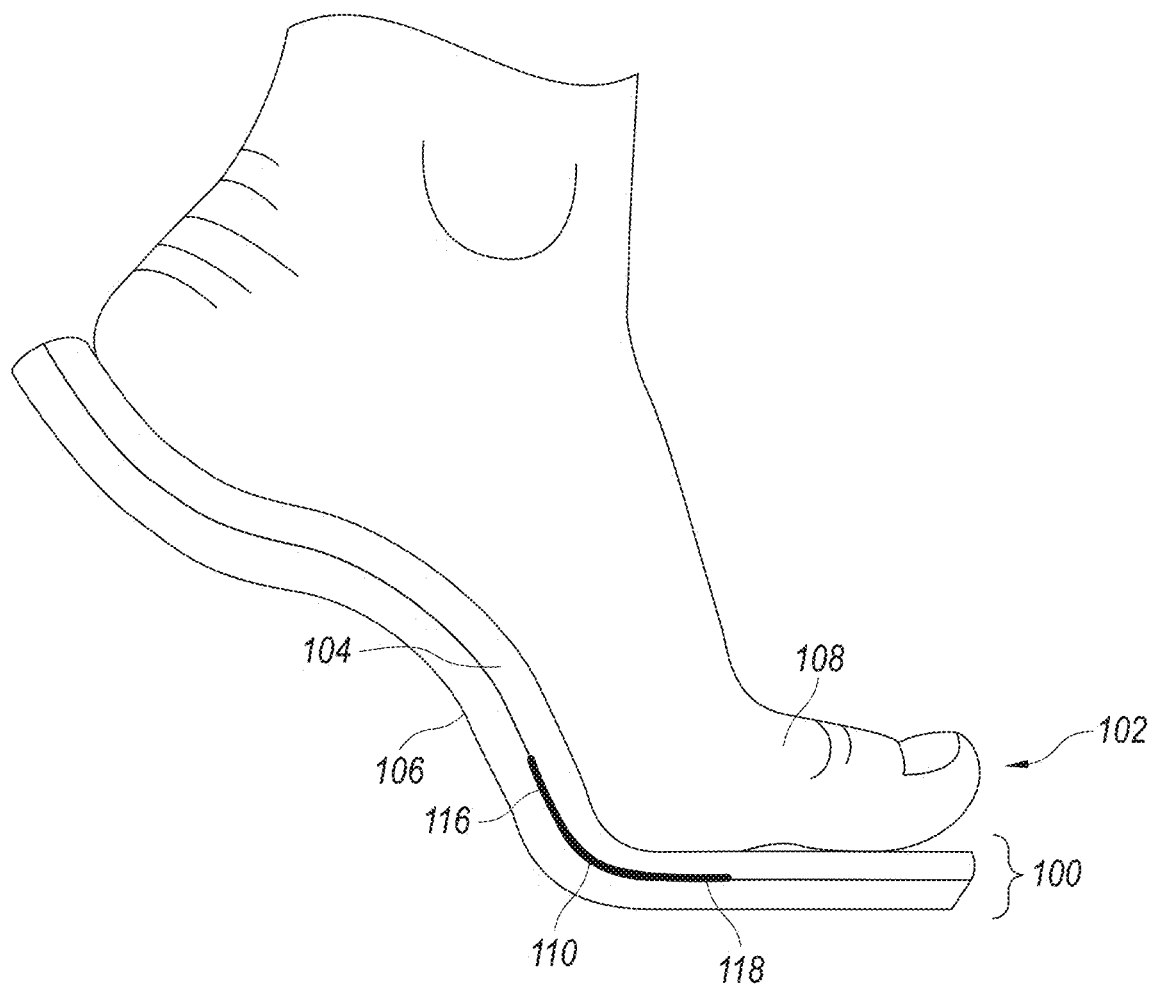
FIG. 15 is a schematic side view of the insole of FIG. 14 supporting a wearer's foot.

FIG. 15 is a schematic illustration of a shoe insert 100 for an article of footwear, in accordance with an embodiment of the present technology. The shoe insert 100 is configured to substantially block or prevent metatarsophalangeal joint sprain due to hyperextension of the toes of a wearer's foot 102, thereby significantly decreasing or even eliminating the risk of a toe injury. The shoe insert 100 provides an anisotropically-flexible area in the region under the metatarsal phalangeal joints of the foot 102. The shoe insert 100 can be shaped to fit within a shoe, or as part of the shoe's sole assembly. The shoe insert 100 could be configured as another article of footwear, for instance, as a sock or foot sleeve. Alternatively, the anisotropically-flexible area defined by the shoe insert 100 could be incorporated into a midsole or outsole of a shoe's sole assembly to provide the same type of hyperextension prevention.

The shoe insert 100 is a joined assembly having one or more layers with a construction substantially similar to the assembly 10 discussed above. The shoe insert 100 has a dorsal (or upward-facing) layer 104 that fits conformably and comfortably against or adjacent to the bottom of the wearer's foot 102 and a plantar (or downward-facing) layer 106 that fits snuggly against the top of the shoe's sole or as part of the sole. The shoe insert 100 can be used with or in an article of footwear 50 discussed above (FIG. 12). The plantar layer 106 generally provides cushioning of the foot 102, and the dorsal layer 104 protects the foot 102 against chafing, as well as providing a lesser degree of cushioning.

The risk of incurring a metatarsophalangeal joint sprain increases with the angle of longitudinal deflection at the metatarsal phalangeal joint 108 of the foot 102 and often happens if deflection exceeds approximately 56°. The precise angle of deflection that results in such a sprain, however, will depend upon many factors, including foot placement and orientation, speed and force of forward movement, physical structure of the individual's foot, and any prior metatarsophalangeal joint sprains or foot injuries. The shoe insert 100 is configured to counter undue deflection that could lead to hyperextension of the metatarsal phalangeal joint 108. The shoe insert 100 incorporates an anisotropically-flexible area 110 situated for placement under the metatarsal phalangeal joint 108 of the foot 102. In general, anisotropic materials exhibit directionally-dependent properties, such that the degrees of flexibility and stiffness differ depending upon the axes at which they are measured.

Figure 16:
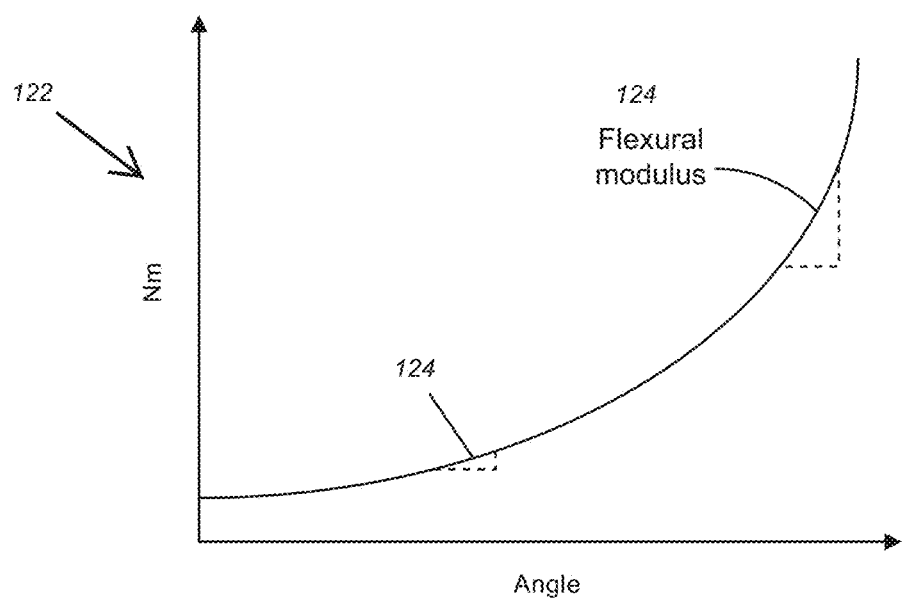
FIG. 16 is a graph showing the relationship of the flexural modulus as a function of shoe torque and angle of curvature.

In the shoe insert 100, the flexing of a shoe is measured in torque where the shoe is flexed about the flex area 110 generally between the forward and rear portions 116 and 118, and the resistance of the shoe flex increases with flex angle due to increasing flexural modulus. FIG. 16 is a graph showing the relationship of the flexural modulus 124 as a shoe flex torque and angle of curvature. The x-axis represents the bend angle of the shoe insert 100 in the dorsal (upward) direction. The y-axis represents shoe flex torque in Newton-meters (Nm) and the relationship of flexural modulus that creates the increase in torque. The increase in flexural modulus 124 is caused by curved columns which are either formed through applied stress (i.e. prebuckling) or weave crimp, as further described infra, that are formed at a predetermined angle or through controlled thermal contraction, which set a level of maximum permissible angle rotation of the shoe sole about the flex area 110. The increase in flexural modulus can thus be described as the ratio of the secondary slope to the primary slope, where the primary slope can be as low as 100 pounds per square inch (psi) and the secondary slope can be as high as 33 million psi. Here, the minimum ratio in a material is approximately 1.25:1 and the maximum ratio is approximately 20:1. In addition, the primary slope can be located between 0° and 15° and the secondary slope can be located beyond approximately 60°. Other ratios and flex range locations are possible. For example, a shoe insert 100 can be configured with the material of the assembly having a ratio of the secondary slope to the primary slope defining the flexural moduli in the range of approximately 1.25:1 to 2.5:1. In another embodiment, the ratio can be in the range of approximately 2:1 to 3:1, 2.5:1 to 4:1, 3:1 to 6:1, 5:1 to 10:1, 6:1 to 13:1, or 10:1 to 20:1.

Figure 17:
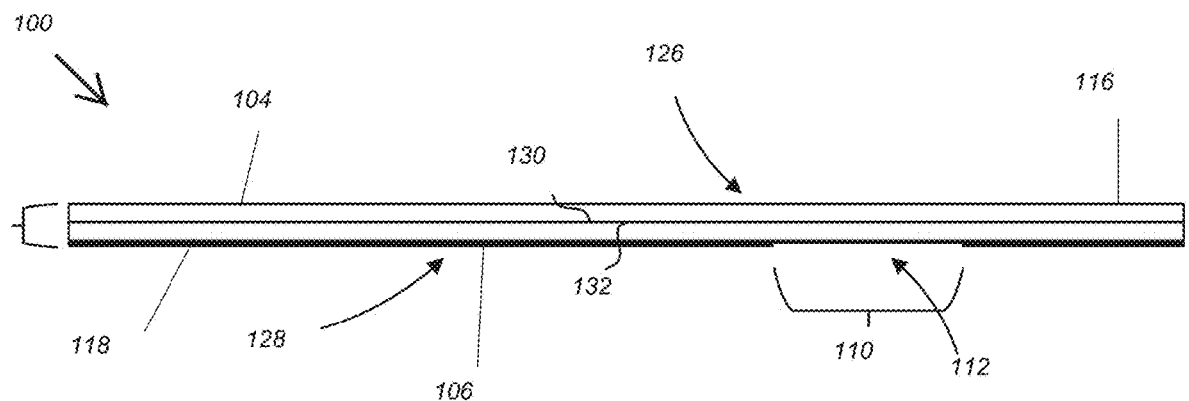
FIG. 17 is a cross-sectional view showing the construction of the shoe insert of FIG. 16.

The shoe insert 100 can use different types of flexible and non-flexible materials that are combined to control the location and orientation of the flex area 110. FIG. 17 is a cross-sectional view showing the construction of the shoe insert 100 of FIG. 15, wherein the dorsal layer 104 is formed of one or more rigid sheets 126 of material, while the plantar layer 106 is formed of one or more flexible sheets 128 of material, exclusive of the flex area 110, with tunable rigid layers 112 of material formed in-between the two rigid and non-rigid layers 126, 128. Alternatively, the shoe insert 100 could be constructed with just a single layer of materials, except for the flex area 110, that helps restrict excessive bending of the wearer's foot.

The tunable rigid layers 112 of material have a construction similar to the assembly 10 discussed above, but inverted, wherein the tunable rigid layers 112 have a dorsal side 130 and a plantar side 132. The material used in the dorsal side 130 has a modulus of elasticity tuned to limit longitudinal deflection based on angular rotation of the metatarsal phalangeal joint 108 in the dorsal direction, that is, forward dorsiflexive motion. The material used in the plantar side 132 has a modulus of elasticity that is comparatively higher than the modulus of elasticity of the flexible material of the dorsal side 130.

Referring again to FIG. 15, the flex area 110 is configured to have an upwardly curved shape when the joined assembly 10 forming the flex area 110 is in the neutral orientation. Accordingly, when the entire shoe insert 100 is in a neutral configuration, the forward portion 116 would be an angle of approximately 50-56 degrees (or other selected angle) relative to the rearward portion 118. When the forward and rearward portions 116, 118 are flat and coplanar (FIG. 17), the fiber-based composite material on the plantar side of the flex area 110 would not substantively resist bending until reaching the 50-56 degree angle. The flex area 110 can be tuned and configured to begin providing bending resistance as the flex area 110 reaches the 50-degree angle, and significantly increasing the bending resistance as the flex area 110 approaches the 56-degree angle, so as to effectively block or prevent the wearer's toes from flexing past 56-degrees. The plantar side of the flex area 110, however, would be in tension and would bias or urge the flex area 110 back toward the neutral orientation. This biasing of the shoe insert toward the 50-56 degree angle could actually provide some energy return to the wearer's foot during a stride cycle as the foot approaches the toe-off phase, all while preventing over bending and hyperextending of the metatarsal joints.

The flex area 110 is preferably situated for placement under metatarsal phalangeal joints 108 (FIG. 15) to provide optimal protection from hyperextension of the toes. In the average person, the flex area 110 would be placed in the region located at about 70% of the total shoe insert length (measuring from the heel to the toes). The rigid layers 112, that is, the areas outside of the flex area 110 on the plantar aspect of the shoe insert 126, should preferably be more rigid than the flex area 110, so as to help prevent the plantar aspect of the foot 102 from flexing in the areas outside of the flex area 110.

The shoe insert 100 lowers or eliminates the risk of incurring a metatarsophalangeal joint sprain ("turf toe") by preventing longitudinal deflection of the foot 102 at the metatarsal phalangeal joint 108 beyond approximately 56°. The shoe insert 100 incorporates an anisotropically-flexible area 110 formed using a fiber-reinforced composite material that exhibits a different modulus of flexibility when a predetermined angle of flexion has been reached. Flexing of the material beyond the predetermined angle is limited or precluded, while preserving pliability of the material within the predetermined angle. This type of anisotropically-flexible area can be incorporated into other forms of protective equipment intended to keep body movement within a normal or constrained range of expected motion without restricting normal free movement up to the predetermined angle, such as in the joint areas of prosthetics, back or articulating braces and supports, and articulating braces. The shoe insert 100 configured to control excessive bending in the toe region to help prevent turf toe can have a flexural moduli with a ratio in the range of approximately 1.25:1 to 2.5:1. In another embodiment the ratio can be in the range of approximately 2:1 to 3:1, 2.5:1 to 4:1, 3; 1 to 6:1, 5:1 to 10:1, 6:1 to 13:1, or 10:1 to 20:1.

Components of the shoe insert 100 coupled to the flex area 110 can be made of a metal, polymer, composite, or combination thereof. In general, the strengths and stiffness of fiber-reinforced composite materials when used in the layers of the shoe insert 100 are dependent on the properties of the type of fiber, the orientation of the fiber, and the matrix used with the fiber. In one embodiment, the material used in the layers of forming the dorsal side 130 of the tunable rigid layer 112 is a carbon fiber epoxy plate, and the material used in the plantar side 132 is either a nitrile butadiene rubber, polyurethanes, or acrylics, or thermoplastic polyurethane films or elastomeric films that are joined to the surface of the flexible fiber substrate defining the dorsal side 130. Other types of materials are possible; however, the modulus of elasticity of the material used in the plantar side 132 must increase in modulus based on the angular rotation of the metatarsal phalangeal joint 108. The material used in the dorsal side 130 must also be higher in modulus than the plantar side 132 to minimize the bending of the arch of the foot and to provide the flex area 110 of the shoe insert 100 with the necessary anisotropically-flexible properties.

Figure 18:
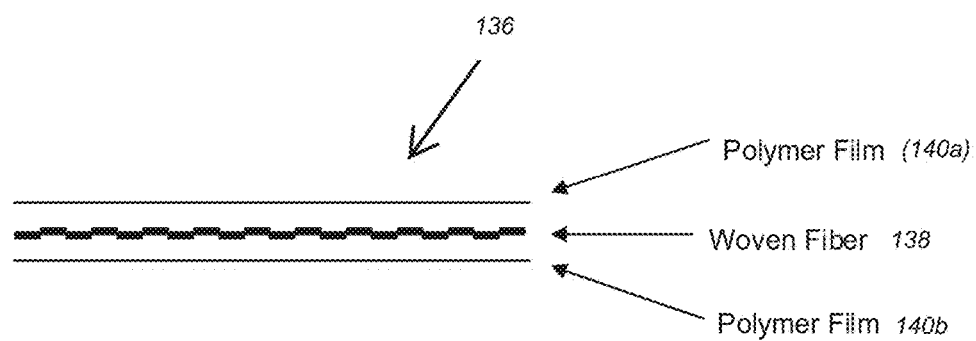
FIG. 18 is a diagram showing the layered construction of the non-rigid flexible carbon fiber composite.

In one embodiment, to construct the shoe insert 100, base carbon fiber fabric is first impregnated with elastomeric binders. The impregnated carbon fiber fabric is then dried until the solvents are removed. Drying time depends upon the solvent ratio and drying temperature. The content of the impregnating elastomeric binders can range from 0.5-50%, but preferably falls within the range of 5-23%, which is dependent upon the modulus ratio desired. No binder can exhibit similar behavior. FIG. 18 is a diagram showing the layered construction of a non-rigid flexible carbon fiber composite 136. An impregnated carbon fiber fabric 138 in one embodiment is pressed at 325° F. at 6 psi for 10 minutes between two sheets 0.004 inch thick films, top 140a and bottom 140b. This process produces a non-rigid flexible carbon fiber composite 136.

Figure 19:
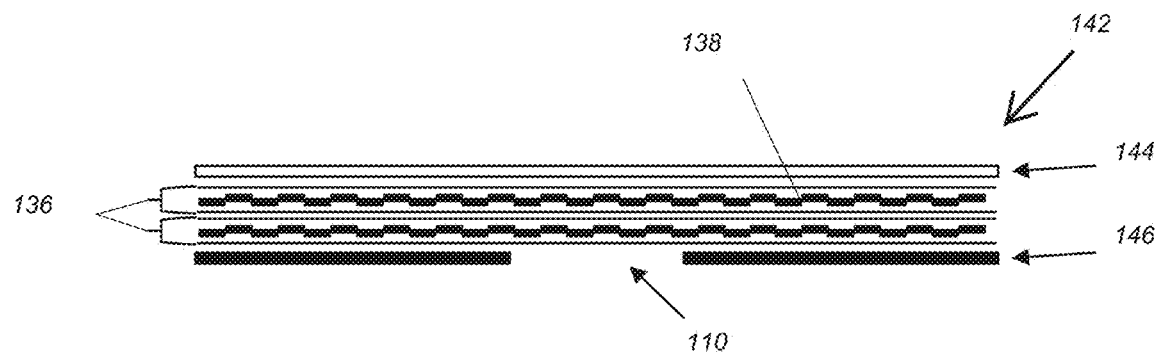
FIG. 19 is a diagram showing the layered construction of a composite laminate.

FIG. 19 is a diagram showing the layered construction of a composite laminate 142. Each carbon fiber composite laminate 142 is comprised of two or more layers of the non-rigid flexible carbon fiber composites 136 joined to one or more rigid carbon fiber plates or other rigid substrates. In one embodiment, on the dorsal layer 104 of the shoe insert 100, a 0.093 inch thick polycarbonate layer 144 is heat pressed to two sheets of the non-rigid carbon fiber composite 136 at a temperature of 300° F. at 6 psi for 10 minutes. On the plantar layer 106 of the shoe insert 100, the two sheets of the non-rigid carbon fiber composite 136 are heat pressed to two pieces of 0.030 inch thick rigid carbon fiber plates 146, or other rigid substrates, such as metal or plastic, at a temperature of 300° F. at 6 psi for 10 minutes. The rigid carbon fiber plates 146 are spaced 1.25-1.5" apart to form a gap that serves as the flex area 110. The newly-formed laminate carbon fiber epoxy plate is allowed to cool to 180° F. before removal from the press.

Figure 20:
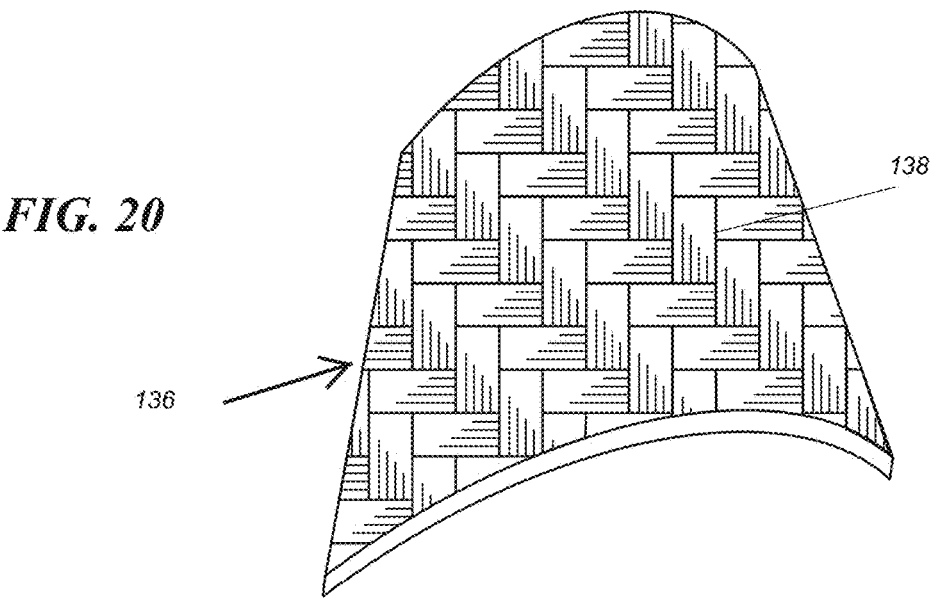
FIG. 20 is a diagram showing, by way of example, column bending in a non-rigid carbon fiber material.

The coefficient of thermal expansion of polycarbonate at 300° F. provides enough shrinkage upon cooling to create a curved column. Non-rigid carbon fiber composites 136 are limited by their compression strength and under compressive loading can form curved columns, which are small bends in the material. FIG. 20 is a diagram showing, by way of example, column bending in a non-rigid carbon fiber composite 136. When the composite material is flexed away from the neutral orientation, thereby putting the non-rigid carbon fibers of the woven carbon fiber fabric 138 into tension, curved columns begin to straighten until a point of straightness at which point the material rapidly increases the maximum tensile loading. This characteristic enables the carbon fiber composite material 136 to be pre-stressed through the curved columns, such that flexing of the material beyond a predetermined angle can be limited or precluded, while preserving pliability before reaching the predetermined angle. The curved columns are formed in the non-rigid carbon fiber composite 136 at a predetermined angle that sets the level of curvature in the curved column; when the non-rigid carbon fiber composite 136 is flexed away from the neutral orientation and the curved columns are placed in tension, the flexural modulus significantly increases, thus enabling the non-rigid carbon fiber composite 136 to fixedly engage or "lock out" further flexion. As the non-rigid carbon fiber composite 136 combines one or more sheets of the non-rigid flexible carbon fiber, breaking or failure of the composite material is precluded, as the degrees to which curved columns are formed will differ as between the individual sheets of the non-rigid flexible carbon fiber with the result that the curved beams of the different sheets tolerate compression, up to the predetermined angle.

The control of temperature and the use of various substrates exhibiting different levels of coefficients of expansion can produce varying amounts of contraction upon cooling to create a desired amount of curvature. The curvature in the column allows the polycarbonate substrate, or other lower modulus flexible materials, to provide the bending stiffness desired and the subsequent straightening of the curved column material imparts a strain stiffening behavior of the resultant flexible composite material.

In a further embodiment, to construct the shoe insert 100, the base carbon fiber fabric 138 is first impregnated with elastomeric binders. The impregnated carbon fiber fabric 138 is then dried until the solvents are removed. Drying time depends upon the solvent ratio and drying temperature. The content of the impregnating elastomeric binders can range from 0.5-50%, but preferably falls within the range of 5-23%, which is dependent upon the modulus ratio desired. This material has substantially the same form of layered construction as the non-rigid flexible carbon fiber composite 136 described supra with reference to FIG. 18. The impregnated carbon fiber fabric is pressed at 325° F. at 6 psi for 10 minutes between two sheets 0.004 inch thick films, top and bottom. This process produces a non-rigid flexible carbon fiber composite.

Figure 21:
FIG. 21 is a diagram showing the layered construction of a laminate stack.

Each assembly is a laminate stack that is composed of two or more sheets of the non-rigid flexible carbon fiber composites and titanium alloy or other rigid substrates. FIG. 21 is a diagram showing the layered construction of the laminate stack 150. In one embodiment, on the plantar layer 106 of the shoe insert 100, two sheets of the non-rigid carbon fiber composite 136 are heat pressed to a 0.043 inch thick polycarbonate layer 151 at a temperature of 300° F. at 6 psi for 10 minutes. The pressed laminate stack 150 is then laid onto a 0.012 inch thick titanium alloy 152 and a 0.020 inch polycarbonate 153 is adhered using a 0.004 inch thick thermoplastic polyurethane film. The combined laminate stack 150 is hot pressed at a temperature of 300° F. at 6 psi for 10 minutes and allowed to cool to 180° F. before removal from the press.

Figure 22:
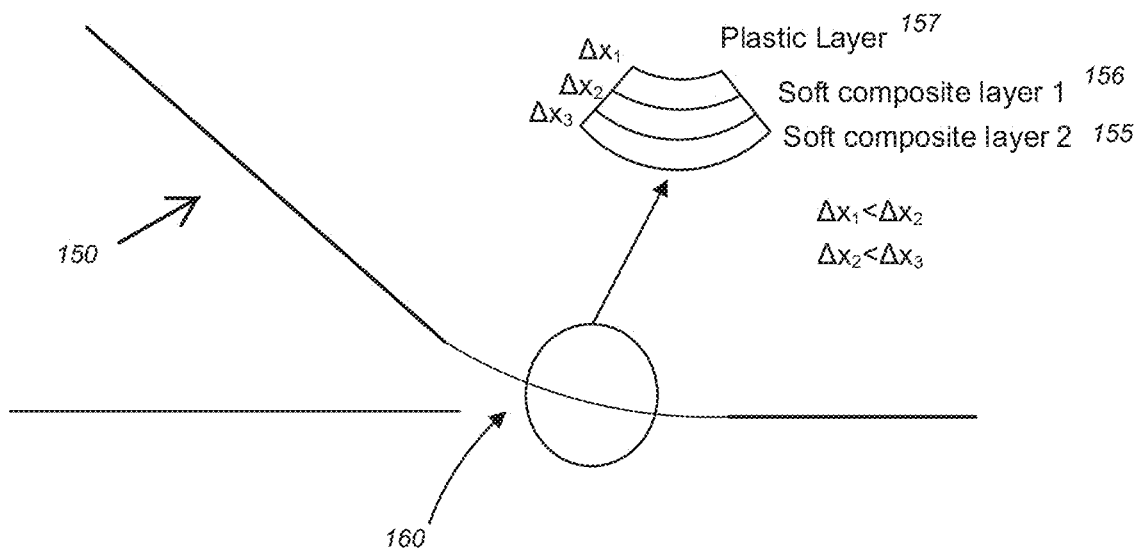
FIG. 22 is a diagram showing the change in length of each layer in the laminate stack of FIG. 21 as the radius changes from an original natural orientation.

Next, the laminate stack 150 is heat formed to an angle of about 56° about a 1.5 inch radius in the desired flex area. Note that an angle of about 56° is applicable to a shoe insert that helps to prevent "turf toe." Different angles may be appropriate to other applications, such as an elbow brace that limits movement during rehabilitation following surgery. The non-rigid carbon fiber fabric 136 is convex to the laminate stack 150. The laminate stack 150 is heat formed though localized heating to form the 1.25 inch to 1.5 inch flex area over the radius using an infrared heating source, a conductive heating block, or directed hot air. The heat forming stretches the flexible carbon fiber fabric's sheets based on their distance from the axis of flex. FIG. 22 is a diagram showing the change in length of each layer 155, 156, 157 in the laminate stack 150 as the radius 158 changes from the original natural axis. The length of each successive layer moving inward towards the axis of flex is shorter than the preceding layer. After the laminate stack 150 is heat formed, the laminate stack 150 is restored to a substantially flat form and the layers 155, 156, 157 in the area of heat forming 160 are placed under compression to form curved columns within the flex area.

In a still further embodiment, to construct the shoe insert 100, base carbon fiber fabric is first impregnated with elastomeric binders. The impregnated carbon fiber fabric is then dried until the solvents are removed. Drying time depends upon the solvent ratio and drying temperature. The content of the impregnating elastomeric binders can range from 0.5-50%, but preferably falls within the range of 5-23%, which is dependent upon the modulus ratio desired. This material has substantially the same form of layered construction as the non-rigid flexible carbon fiber composite 136 described supra with reference to FIG. 18. The impregnated carbon fiber fabric is pressed at 325° F. at 6 psi for 10 minutes between two layers 0.004 inch thick films, top and bottom. This process produces the flexible non-rigid carbon fiber composite 136.

Figure 23:
FIG. 23 is a diagram showing the layered construction of the carbon fiber joined plate.
Figure 24:
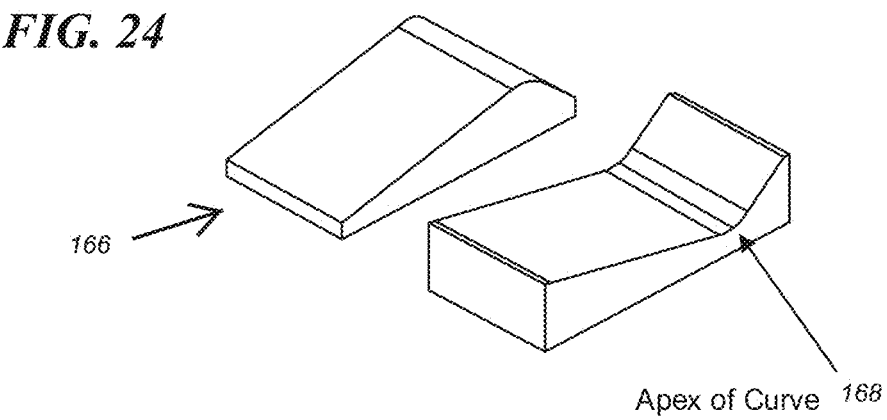
FIG. 24 is a diagram showing a heat forming tool for use with the carbon fiber joined plate of FIG. 23.

Each assembly is composed of one or more layers of the non-rigid flexible carbon fiber composites 136 and a rigid substrate of polycarbonate or titanium, or a rigid composite plate. FIG. 23 is a diagram showing the layered construction of a carbon fiber joined plate 164. In one embodiment, on the plantar layer 106 of the insert 100, two layers of the non-rigid carbon fiber fabric 138 are placed on top of a 0.020 inch thick rigid substrate 164 of polycarbonate or titanium, or a rigid composite plate. The layered pieces are then placed between two sheets of release paper and heat formed. FIG. 24 is a diagram showing a heat forming tool 166 for use with the carbon fiber joined plate 164 of FIG. 23. The layered pieces placed into the heat forming tool 166, which is then heated. The apex of the curve 168 in the center of the flex area 110 (FIG. 17) of the sole is formed into the base of the tool 166. The layered pieces are heat pressed at a temperature of 300° F. at 6 psi for 10 minutes, and then cooled to 180° F. before removal from the press.

In a yet further embodiment, a layer of unidirectional fiber tape is impregnated with elastomeric binders and joined to a rigid substrate of polycarbonate or titanium, or a rigid composite plate, such as described with reference to FIG. 23. The joined unidirectional fiber tape is then placed between two layers of the non-rigid carbon fiber composite 136 and heat formed though localized heating or shaped using a heat forming tool 166, which stretch the fiber layers to create curved columns.

Metals or plastics such as titanium and polycarbonate can be stamped or molded with shapes, slits, and perforations. Shapes can include but are not limited to pre-shaped buckles and bumps. Slits can be straight or curved in a staggered or array pattern. Perforations can be circles, ellipses, rectangles or squares.

The two components of the shoe insert 100 are joined together to form a joined beam through laminating temperatures ranging from 200° F. to 375° F. for about ten minutes or less and a pressure ranging from 2 psi to 8 psi, but is dependent upon the material melting point and its ability to flow. The resulting joined beam exhibits an increase in modulus based on angular rotation of the metatarsal phalangeal joint 108 in the flex area 110 (FIG. 14). The increase in modulus exponentially increases in high bending stiffness (moduli) until about an angle of 56°, after which a rapid rise in stiffness or a locking of the materials prevent the flex area 110 from bending any further, thereby protecting the metatarsal phalangeal joint 108 (FIG. 15) from hyperextension.

Figure 25:
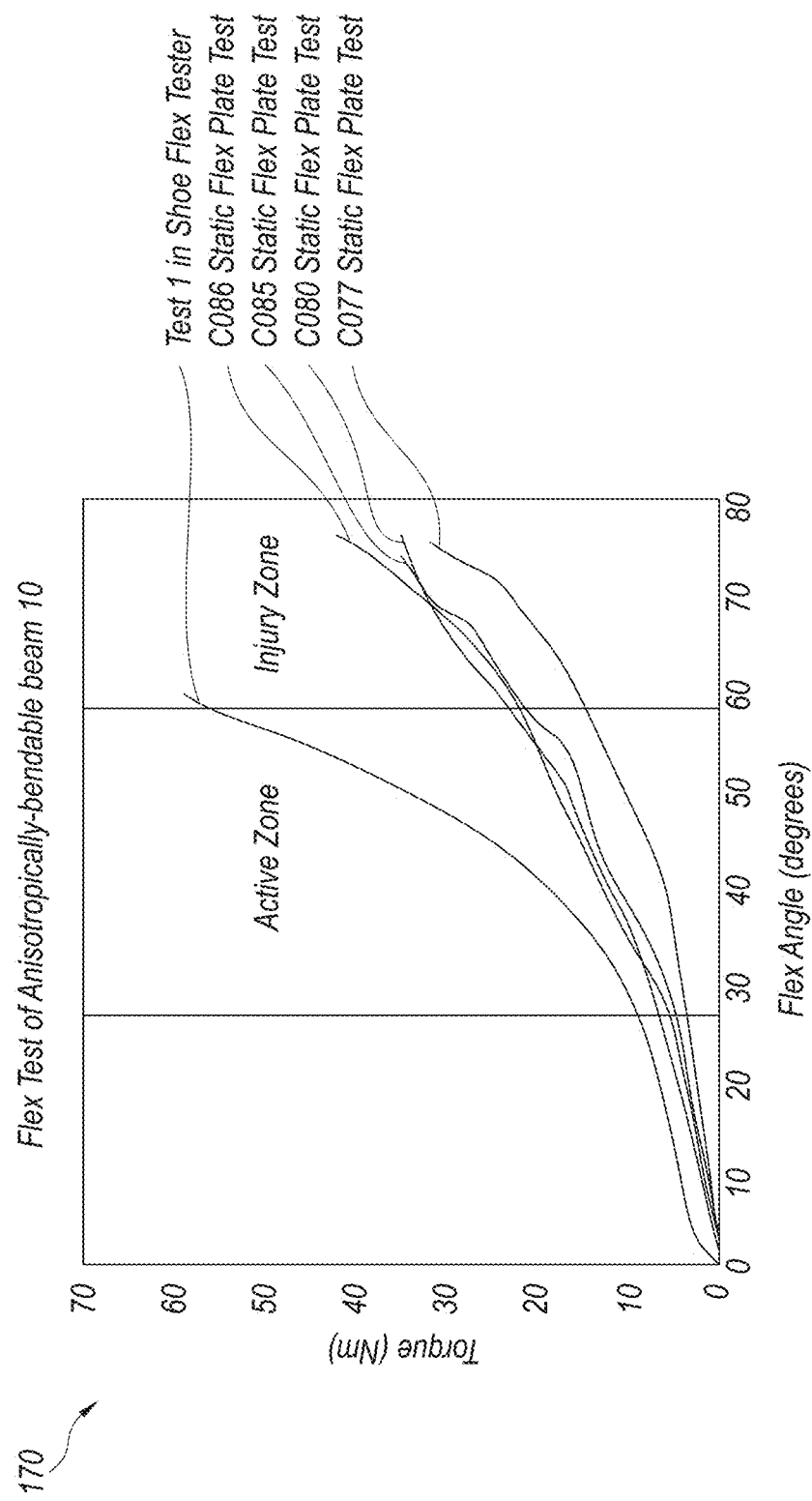
FIG. 25 is a graph showing, by way of example, the differences between flexural moduli in exemplary testing configurations.

Different configurations and combinations of fiber, such as carbon, glass, Kevlar, composite materials, metal foils, and plastic sheets can be advantageously used in the tunable rigid sheets 112 to construct the anisotropically-flexible area 110. The flex experienced by footwear when combined with a shoe insert 100 can be empirically measured using a dynamic flexion shoe flexion device, such as the Shoe Flexer product, manufactured by Exeter-Research, Inc., Brentwood, N.H., which dynamically flexes each shoe while measuring the torque required to flex about the flex area 110. A three-point bend on such an anisotropically-flexible shoe insert 100 at the flex area 110 can be used to measure torque (moments) at angles below 25° quasi-statically for low torque angle measurements. FIG. 25 is a graph 170 showing, by way of example, the differences between flexural moduli in exemplary testing configurations. The x-axes represent flex angle in degrees. The y-axes represent torque in Nm. The empirical testing was conducted using a shoe equipped with an anisotropically-flexible shoe insert 100 at the flex area 110 that achieved dynamic testing results not reached in traditional football cleat construction with 60 Nm at 60° of flex angle. Conventional football cleat technology has torque values of 16-18 Nm at 75° of flex angle. The dynamic flex tester flexes the shoe at a rate of 600-800 degrees per second. The flex test data demonstrates control of increasing torque at controlled flex angles based on construction and materials in the flex area 110.

Figure 26A:
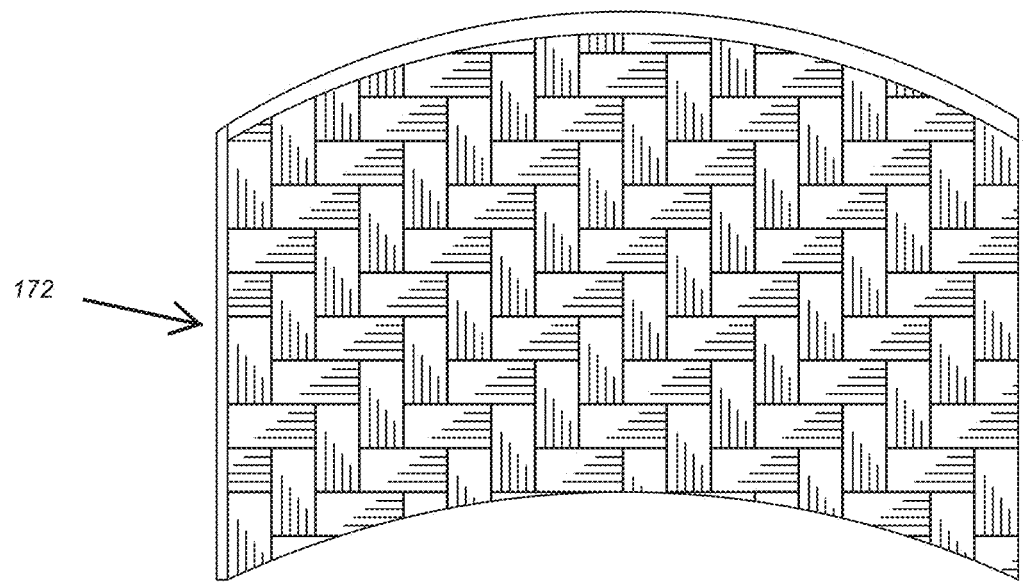
FIGS. 26A-B are illustrations showing, by way of examples, controlled curvature in columns in a non-rigid carbon fiber material under pre-compression through thermally controlled contraction, by pre-forming to a predetermined engagement angle and by segmented wedges with combined angles achieving 56° flex angle and fully engaging the non-rigid carbon fiber at a predetermined lock-out angle.
Figure 26B:
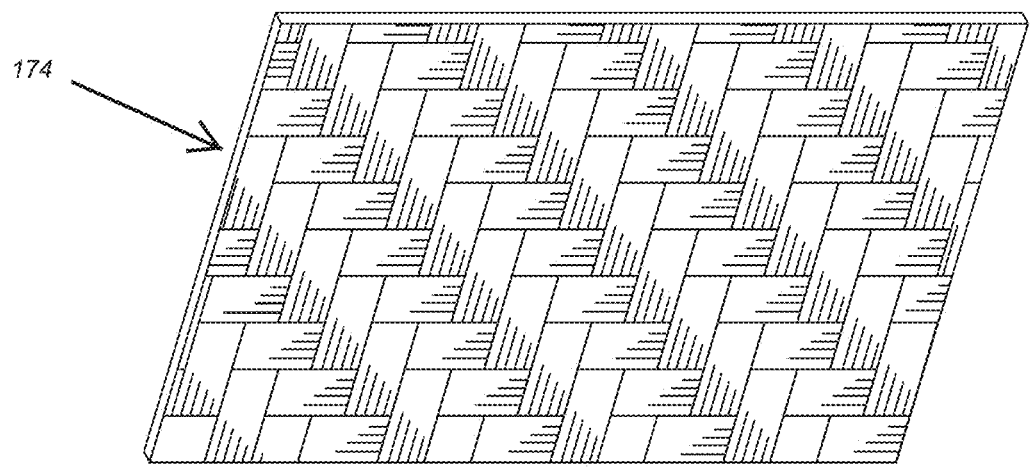

The range of motion stiffness can be tuned through variation in moduli combinations and laminate construction. The moduli can be changed based on resin matrix modulus, fabric weave pattern, and fiber orientation. FIGS. 26A and 26B are illustrations showing, by way of examples, controlled curvature in columns in a non-rigid carbon fiber material 172, 174 under pre-compression through thermally controlled contraction, by pre-forming to a predetermined engagement angle and by segmented wedges (or partial cuts or cut-through designs) with combined angles achieving 56° flex angle and fully engaging the non-rigid carbon fiber at a predetermined lock-out angle. The segmented wedges, partial cuts or cut-through designs are formed into the shoe insert 100 such that the modulus of elasticity remains low until the segmented wedges, partial cuts or cut-through designs compress into a substantially solid structure after which the modulus of elasticity increases. By changing the matrix modulus, the buckling resistance will change, therefore changing the engagement point of the material. The matrix modulus can vary between less than 50 psi to greater than 300,000 psi.

The engagement point is variable, based on the level of contraction or pre-formed angle. The amount of curvature in the column at each level can be adjusted by varying the number of sheets of fibers and controlling whether the fibers are unidirectional or weaved. For example, a two-layer non-rigid carbon fiber material that has been joined to a high modulus substrate will have an inner layer of carbon fiber material joined against the high modulus substrate with a lower level of curvature in the column and an outer layer of carbon fiber material with higher amounts of curvature in the column that engage at different angles of rotation. The combination provides a varying modulus of elasticity as the fibers become more and more engaged under strain.

The engagement point also changes based on the weave density. Weave densities affect weave crimp by changing the spacing of the transverse tows, thereby changing the column length for buckling during thermal or preformed curvature control. For example, a 268 gsm fabric will have approximately 16 tows per inch, which yields a tow spacing of 0.0625 inches and with a 2×2 twill pattern gives a 0.125 inch column length. A 200 gsm fabric will be 12.5 tows per inch, which yields a tow spacing of 0.080 inches and with a 2×2 twill pattern gives a 0.160 column length. Shorter column lengths decrease the amount of flex angle engagement while longer column lengths increase the amount of flex angle engagement. Other suitable weave pattern, densities and fiber weights are possible. For example, tow or fiber bundle diameters may vary based on the number of filaments in the bundle, and common carbon fiber bundle sizes have a range of 1,000 to 50,000 filament fibers.

Referring back to FIG. 25, the torque should target below 10-12 Nm in athletic footwear at up to 25° of flex. The lower the value becomes, the more freely the metatarsal phalangeal joint is able to rotate, which minimizes fatigue. The torque value should increase up to 30 Nm at up to 56° of flex, and beyond 56° of flex, the torque value should meet or exceed 60 Nm at up to 75° of flex. FIG. 25 also shows a comparison of different constructions of the flex test with plate construction only without the shoe being tested and in static test versus the shoe test being tested in dynamic. The values of the plates can be controlled through all zones with increasing of stiffness through the active zone and with a rapid increase in stiffness beyond 60° of flex. Shifting the fabric can increase the modulus in tension as the fibers orient during strain, which decreases the fiber angle and aligns with the load to increase in strength.

In a further embodiment, an anisotropically-flexible beam can be constructed as a weave pattern and unidirectional fibers that provide differing moduli based on weave direction and fiber orientation. This material changes layer orientations of the non-rigid material to provide strain-stiffening behavior as discussed above.

While the invention has been particularly shown and described as referenced to the embodiments thereof, those skilled in the art will understand that the foregoing and other changes in form and detail may be made therein without departing from the spirit and scope of the invention.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. An anisotropic bendable plate assembly comprising:
a first layer of flexible material having a plurality of arranged fibers, wherein the first layer has a first rigidity, a first tensile modulus, and a first compressive modulus lower than the first tensile modulus; and
a rigid second layer fixedly connected to the first layer in a substantially parallel orientation, the second layer having a second rigidity greater than the first rigidity;
wherein the plate assembly is elastically bendable in a first direction with an outer surface of the first layer being in compression, with the plurality of arranged fibers elastically buckled, and the plate assembly is elastically bendable in a second direction opposite the first direction with the outer surface of the first layer being in tension, and the plate assembly has a first bending stiffness during bending in the first direction and a second bending stiffness greater than the first bending stiffness during bending in the second direction.

2. The plate assembly of claim 1 wherein the arranged fibers are at least partially embedded in a matrix material.

3. The plate assembly of claim 1 wherein the first layer comprises a binder material and wherein the arranged fibers are at least partially impregnated with the binder material.

4. The plate assembly of claim 1 wherein the first layer comprises a thermoplastic film coupled to the arranged fibers.

5. The plate assembly of claim 4 wherein the thermoplastic film comprises polyurethane.

6. The plate assembly of claim 4 wherein the thermoplastic film is positioned between the arranged fibers and the second layer.

7. The plate assembly of claim 1 wherein the first layer comprises a plurality of sheets of the arranged fibers joined together.

8. The plate assembly of claim 1 wherein the second layer comprises a composite fiber material.

9. A sole assembly for an article of footwear, the sole assembly comprising:
an outsole;
a midsole coupled to the outsole; and
an anisotropic plate assembly positioned adjacent to the midsole, the plate assembly comprising:
an upper layer having a first rigidity, a first tensile modulus, and a first compressive modulus different than the first tensile modulus, wherein the upper layer is configured to elastically buckle under compression and wherein the upper layer comprises a plurality of arranged fibers at least partly encapsulated in a matrix material;

a rigid lower layer having a second rigidity greater than the first rigidity, and having a second tensile modulus and a second compressive modulus substantially the same as the second tensile modulus; and a thermoplastic film arranged between the upper and lower layers, wherein— the upper and lower layers are joined together at an interface area defined by the thermoplastic film, the plate assembly is elastically bendable in opposing first and second directions, wherein an outer surface of the upper layer is in compression during bending in the first direction and in tension during bending in the second direction, and the plate assembly has a first bending stiffness during bending in the first direction and a second bending stiffness greater than the first bending stiffness during bending in the second direction.

10. The sole assembly of claim 9, further comprising a neutral bending plane substantially parallel to the interface area.

11. The sole assembly of claim 9 wherein the lower layer comprises a rigid fiber-reinforced composite material.

12. The sole assembly of claim 9 wherein the upper layer comprises a woven fabric of fibers having an offset angle.

13. The sole assembly of claim 9 wherein the upper layer comprises a fabric with a weave pattern having a first fabric tensile modulus in one direction and a second fabric tensile modulus different than the first fabric tensile modulus in a direction substantially transverse to the one direction and substantially in the same plane.

14. The sole assembly of claim 9 wherein the first direction is plantar flex direction and the second direction is a dorsal flex direction.

15. The sole assembly of claim 9 wherein the lower layer comprises a rigid composite fiber material that includes woven fibers embedded within a matrix.

16. An anisotropic composite material assembly, comprising:

a first layer comprising a plurality of sheets of fabric joined together and each having first fibers interlaced with second fibers at a selected angle relative to each other, wherein the first layer has a first rigidity, a first tensile modulus, and a first compressive modulus, and wherein at least the first or second fibers in the plurality of sheets of fabric are configured to elastically buckle under coplanar compressive loads;

a rigid second layer joined to the first layer at an intermediate interface area, the second layer comprising a rigid material having a second rigidity greater than the first rigidity, and having a second tensile modulus and a second compressive modulus; and a thin intermediate film at the intermediate interface area and being affixed to the first and second layers, wherein the assembly is elastically bendable about an axis in a first direction that puts the first layer in tension and the second layer in compression, the assembly is elastically bendable about the axis in a second direction opposite to the first direction that puts the first layer in compression and the second layer in tension, and the assembly has a first bending stiffness when the assembly is bent in the first direction and a second bending stiffness less than the first bending stiffness when bent in the second direction.

17. The assembly of claim 16 wherein the intermediate film is a thermoplastic film having a thickness of approximately 0.0005-0.025 inches.

18. The assembly of claim 16 wherein the rigid second layer comprises a composite fiber material.

19. The assembly of claim 18 wherein the composite fiber material comprises woven fibers embedded within a matrix.

20. The assembly of claim 18 wherein the first tensile modulus is greater than the first compressive modulus and the second tensile modulus is substantially the same as the second compressive modulus.

* * * * *